Jan. 22, 1957  J. G. GROSS ET AL  2,778,925
ELECTRICAL DISCHARGE CUTTING MACHINE
Filed Feb. 25, 1955  11 Sheets-Sheet 1
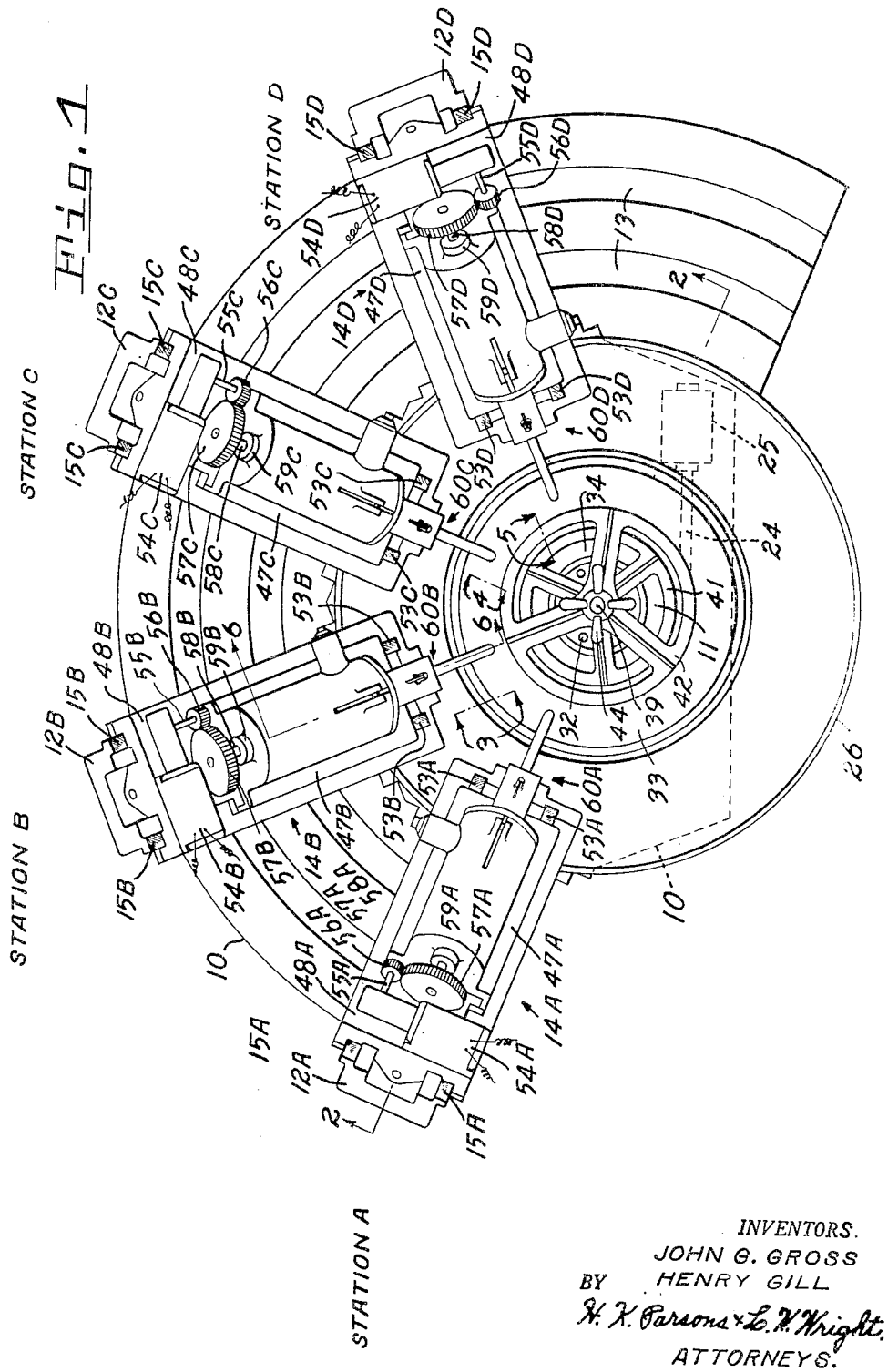
INVENTORS.
JOHN G. GROSS
BY  HENRY GILL
H. K. Parsons & L. W. Wright.
ATTORNEYS.

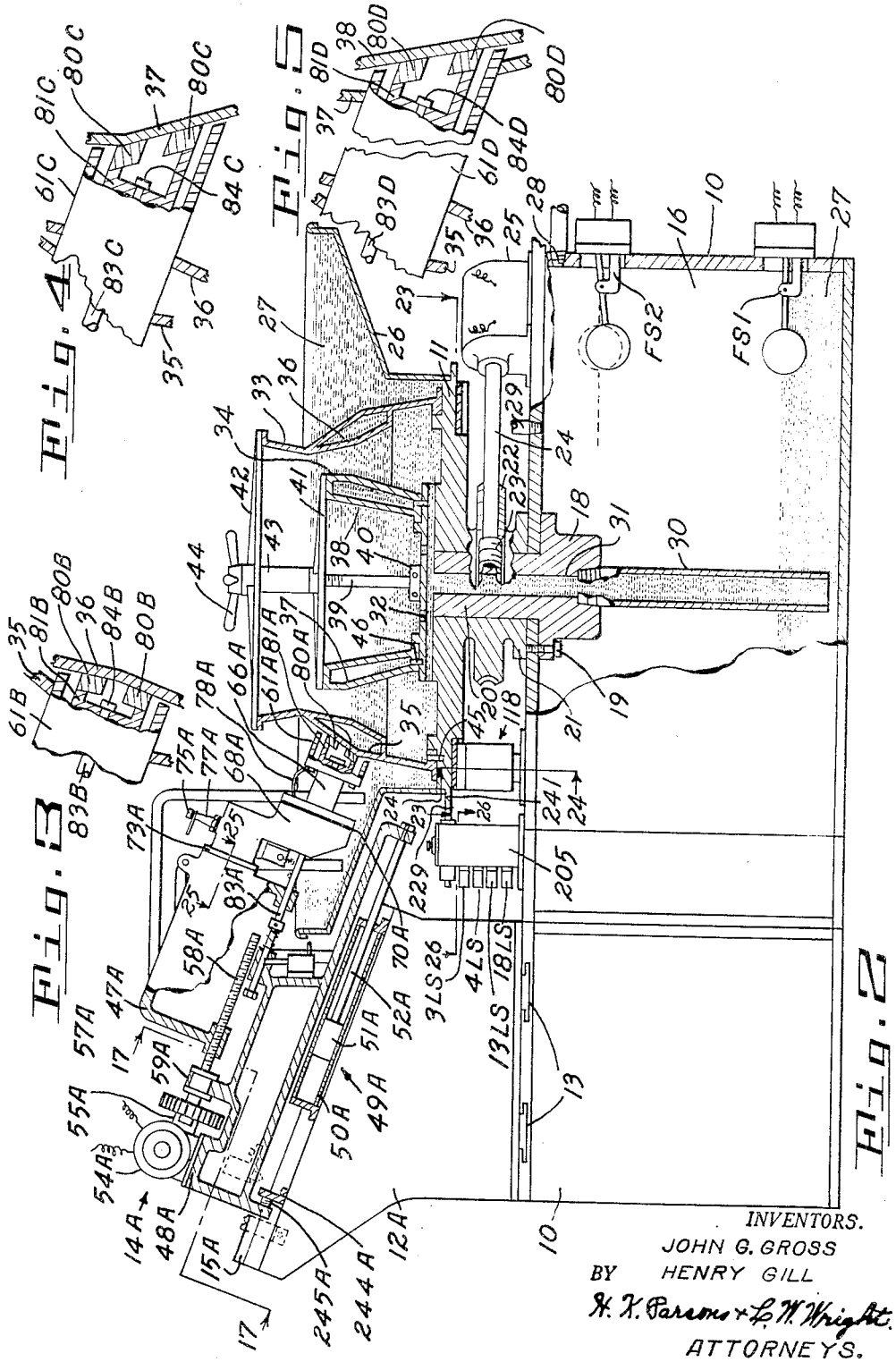

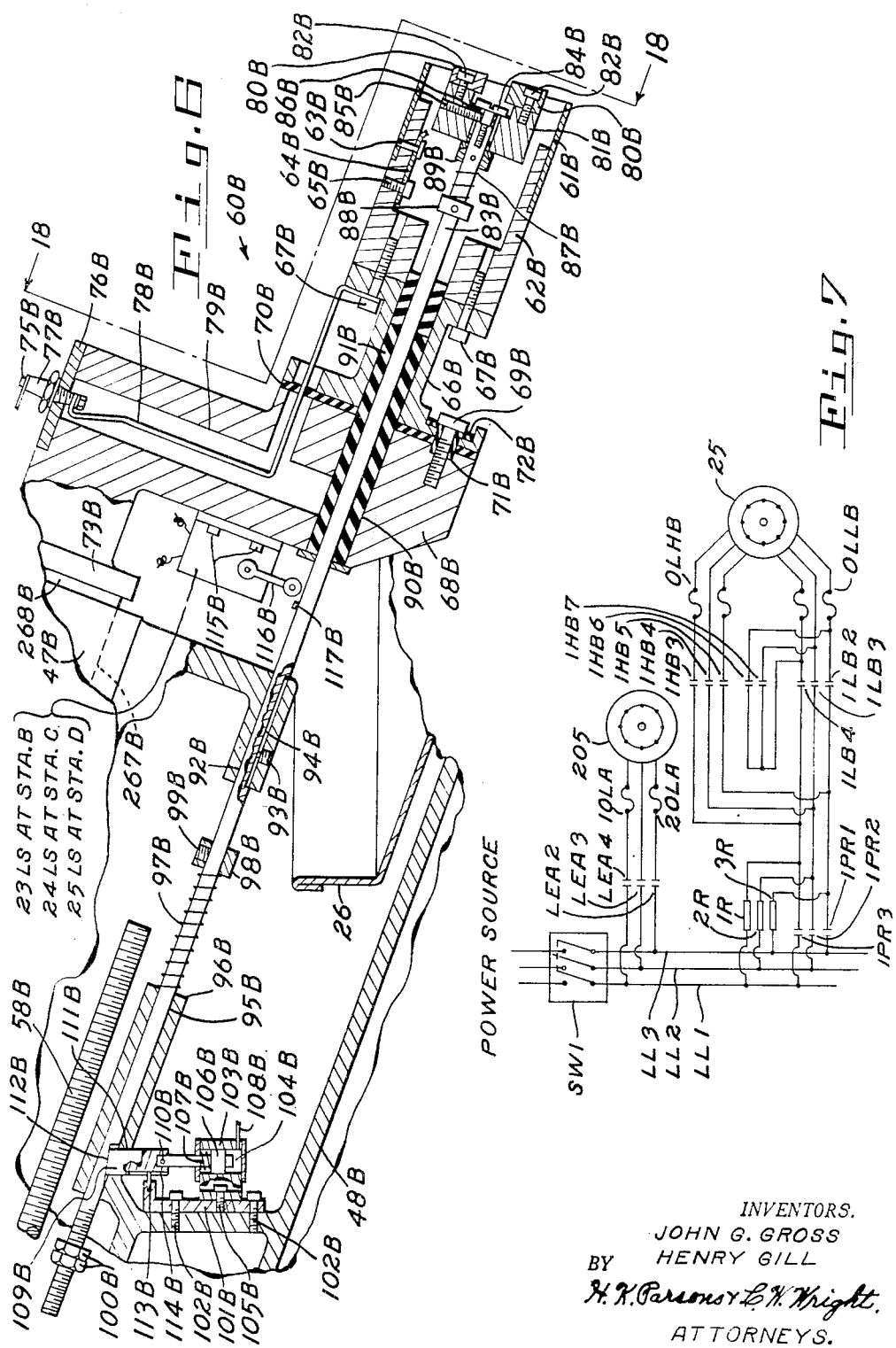

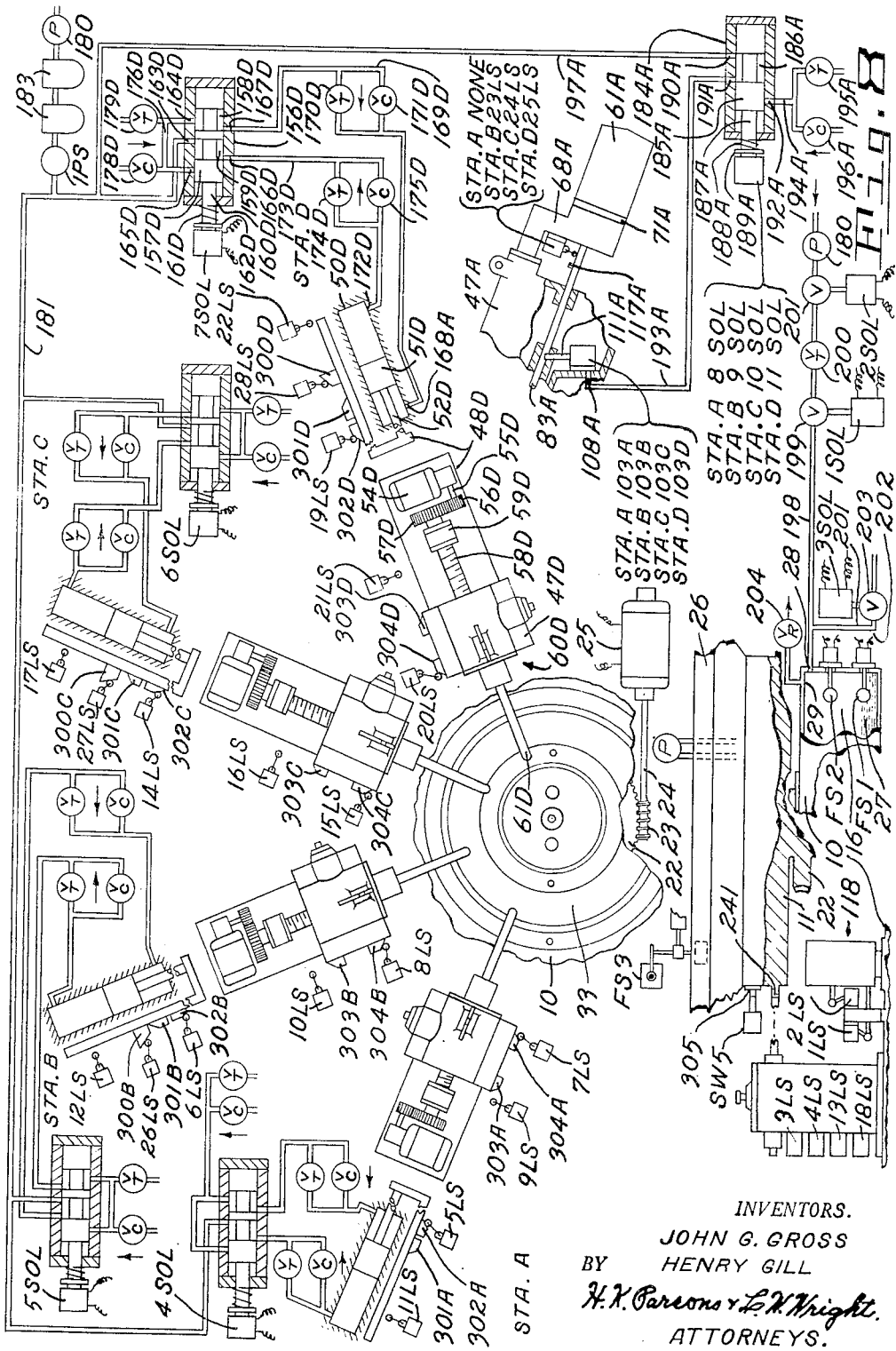

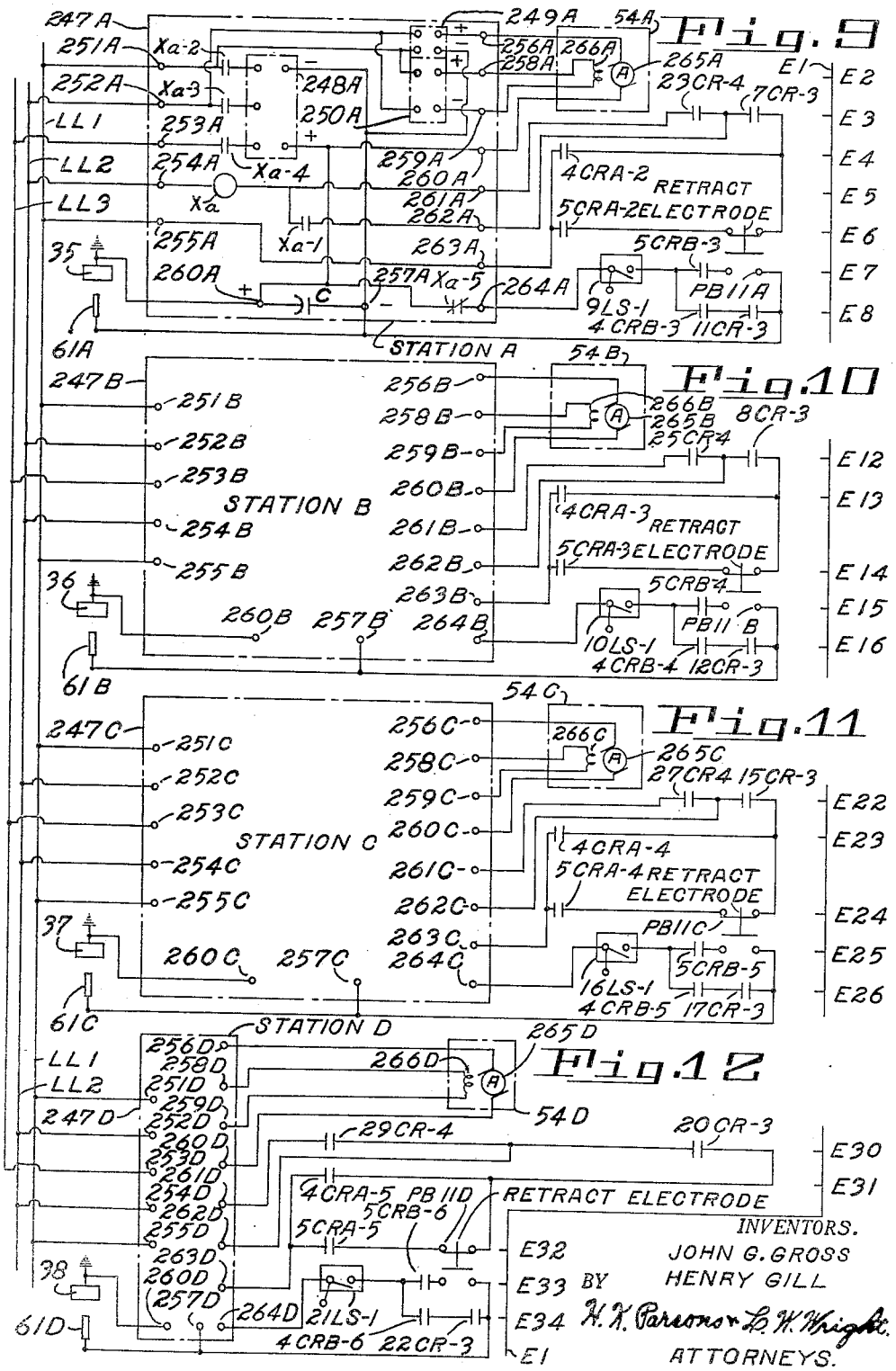

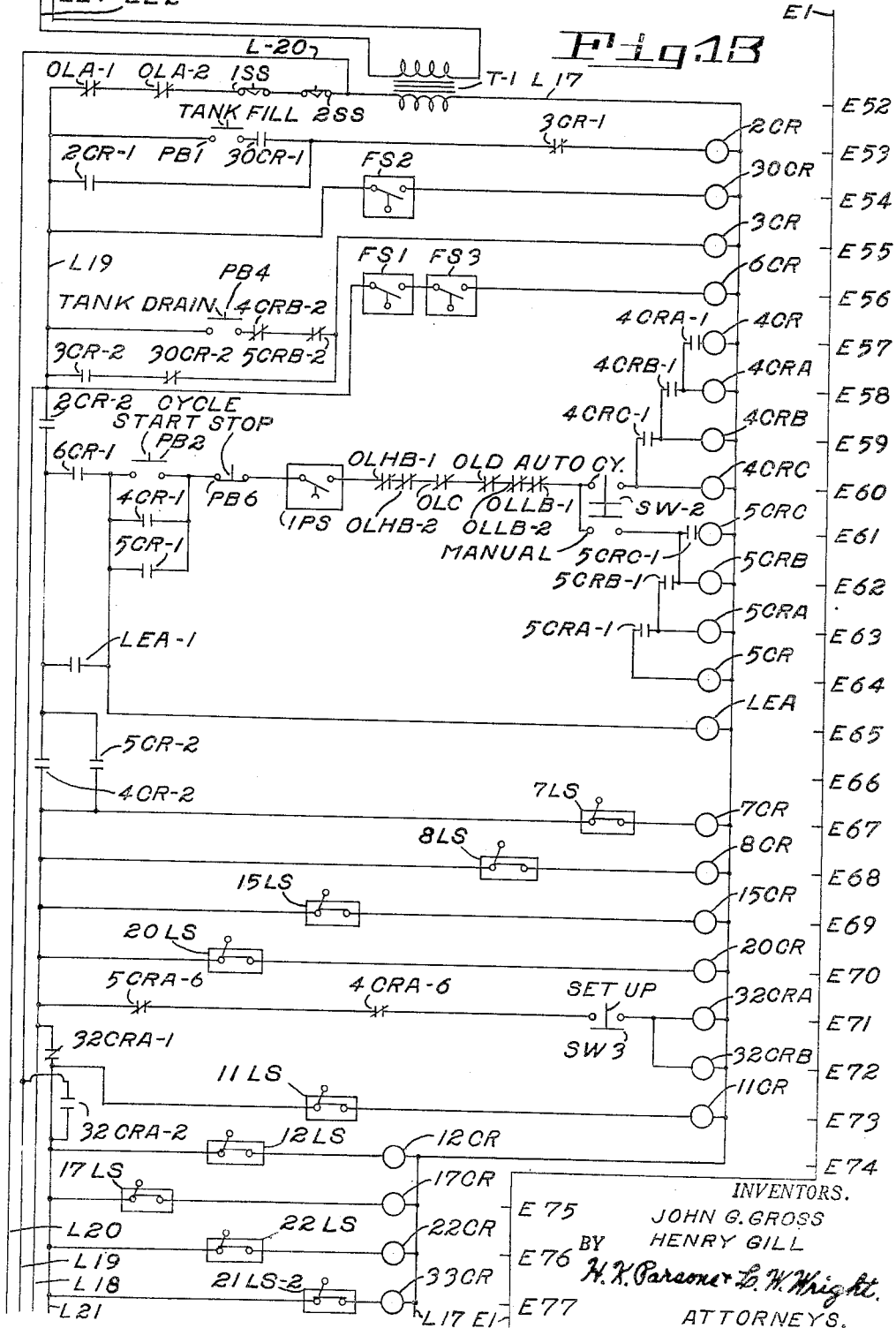

Fig. 14

INVENTORS.
JOHN G. GROSS
HENRY GILL
BY H.K.Parsons & L.W.Wright.
ATTORNEYS.

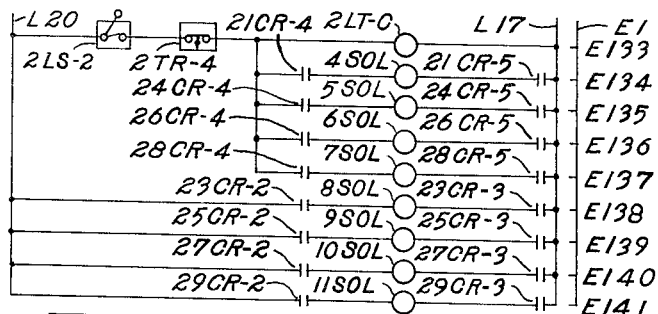
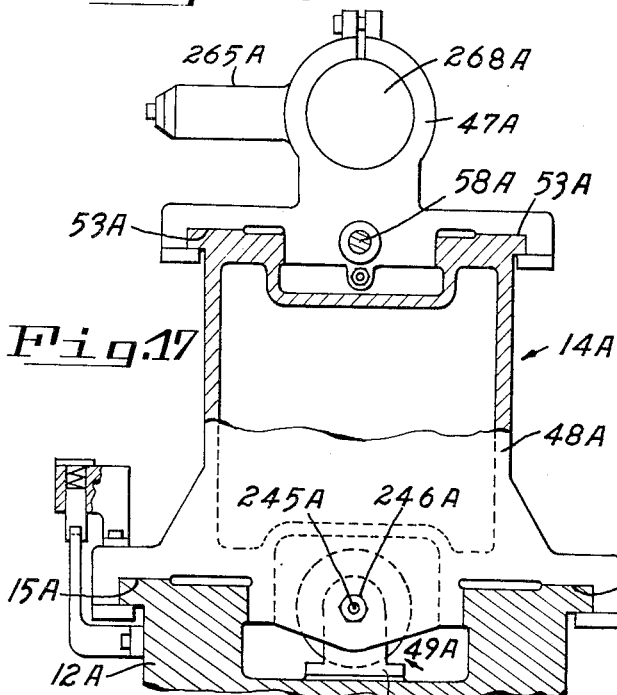
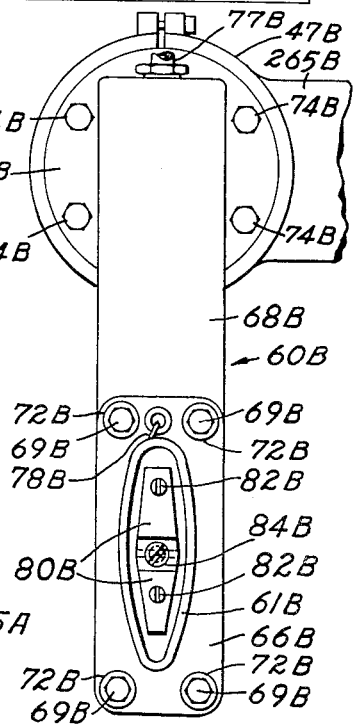
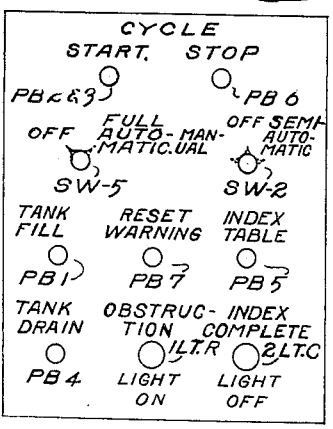

Jan. 22, 1957 J. G. GROSS ET AL 2,778,925
ELECTRICAL DISCHARGE CUTTING MACHINE
Filed Feb. 25, 1955 11 Sheets-Sheet 10

INVENTORS.
JOHN G. GROSS
HENRY GILL
BY
H. K. Parsons & L. W. Wright
ATTORNEYS.

Jan. 22, 1957  J. G. GROSS ET AL  2,778,925
ELECTRICAL DISCHARGE CUTTING MACHINE
Filed Feb. 25, 1955  11 Sheets-Sheet 11
| INDEX NO. | TABLE MOTION FOR 1CY | 3 214 A | 4 215 B | 13 216 C | 18 217 D |
|---|---|---|---|---|---|
| | | ←LS.NO. ←CAM NO. ←STA.NO. | | | |
| a | 45° | C | O | O | O |
| b | 90 | C | C | O | O |
| c | 135 | C | C | C | O |
| d | 180 | C | C | C | C |
| e | 225 | C | C | C | C |
| f | 270 | C | C | C | C |
| g | 315 | C | C | C | C |
| h | 360 | C | C | C | C |
| i | 405 | O | C | C | C |
| j | 450 | O | O | C | C |
| k | 495 | O | O | O | C |
| l | 540 | O | O | O | O |
| m | 585 | O | O | O | O |
| n | 630 | O | O | O | O |
| o | 675 | O | O | O | O |
| p | 720 | O | O | O | O |
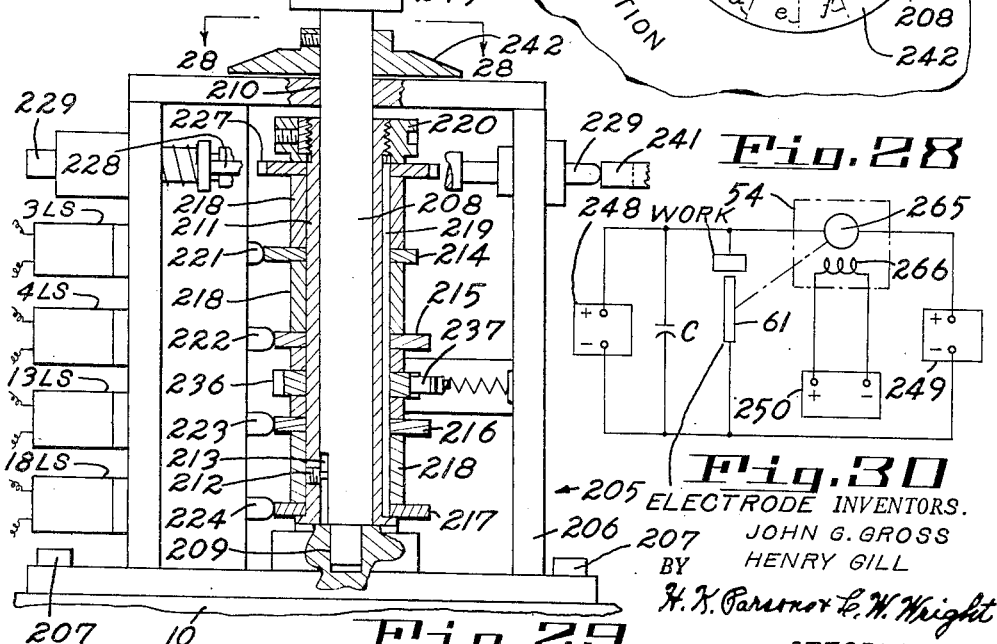
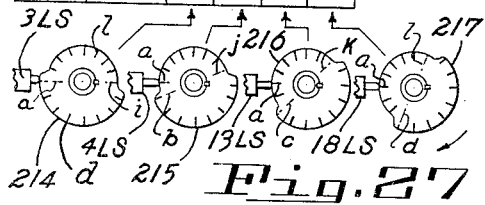
Fig.27
INVENTORS.
JOHN G. GROSS
HENRY GILL
BY H. K. Parsons & C. W. Wright
ATTORNEYS.

United States Patent Office 2,778,925
Patented Jan. 22, 1957

2,778,925

ELECTRICAL DISCHARGE CUTTING MACHINE

John G. Gross and Henry Gill, Cincinnati, Ohio, assignors to The Cincinnati Milling Machine Co., Cincinnati, Ohio, a corporation of Ohio Application February 25, 1955, Serial No. 490,664

23 Claims. (Cl. 219—69)

This invention relates primarily to an electrical discharge cutting machine and apparatus and more specifically to a new and improved automatic cycle control thereof.

Throughout the advent of time, the machine tool industry has tried to keep pace with metallurgical developments by providing machining methods and means whereby industry may realize an immediate enjoyment of the developments of the art. With the development of harder materials, such as cemented carbide, tungsten carbide, and the like, which are virtually unmachinable with present tools, diamond-tip tools for some time have been the only practical means for machining such materials.

At the present time, imports and reclamation of diamond bort are limited and, although there may be some increase, these might not be sufficient to produce the tools and military end items in the event of a substantially increased preparedness or mobilization program. In addition, many new military items, which involve hard-to-machine materials, are being developed, and the anticipated rate of production of these is very large. This will make the diamond bort procurement situation even more serious.

Therefore, there is a great need for the development of new processes that do not require diamond bort. It has been found that the method of electrical-discharge machining of electrical conductive materials, including the hard-to-machine materials, has proven to be most satisfactory due to the ease, simplicity, and high degree of machining accuracy obtainable with a relatively inexpensive and easy to form cutting element composed of such materials as brass or the like. In addition, the electrical-discharge method of machining has the advantage that non-geometric shaped holes or openings may be trepanned or otherwise formed in a workpiece, whereas prior conventional methods of machining have been limited to the formation of holes which exhibit a geometric shaped pattern.

Conventional machines and even electrical-discharge machines to date have been handicapped in that the drilling or forming of successive irregular-shaped, in-line holes or slots in successive non-parallel and undulatory work surfaces which lack coplanarity, has required many cycles of manual and complicated time-consuming operations, all of which increases the time required to complete the machining operation.

Therefore, one of the principal objects of this invention is to devise a new and improved method and means whereby irregular shaped holes or slots may be cut in any undulatory or the like work surface whose surface contour does not lie in a singular plane; i. e., lacking coplanarity.

Another object of this invention is to devise a new and improved method and means whereby a plurality of irregular shaped holes or slots may be cut or formed simultaneously in an undulatory or the like work surface.

Still another object of this invention is to devise a new and improved method and means whereby successive irregular-shaped, in-line holes or slots may be cut or formed in successive non-parallel, undulatory, or the like work surfaces.

A further object of this invention is to devise a new and improved method and means whereby a plurality of irregular shaped, in-line holes or slots may be simultaneously and successively cut or formed in a plurality of successive, nonparallel, undulatory, or the like work surfaces.

A further important object of this invention is to provide a new and improved automatic control mechanism to govern the cyclic movement of a plurality of tooling elements with respect to a plurality of work surfaces either simultaneously or consecutively to produce radially spaced holes in successive surfaces and at a plurality of points about the periphery of said surfaces with respect to a common focal point.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals denote like or similar parts:

Figure 1 is a plan view of the machine.

Figure 2 is a side elevation of the machine as viewed on the line 2—2 of Figure 1, partly in section.

Figure 3 is a detail view partly in section of the electrode at station B relative to its respective work surface as viewed on the line 3—3 of Figure 1.

Figure 4 is a detail view partly in section of the electrode at station C relative to its respective work surface as viewed on the line 4—4 of Figure 1.

Figure 5 is a detail view partly in section of the electrode at station D relative to its respective work surface as viewed on the line 5—5 of Figure 1.

Figure 6 is a sectional view of the electrode structure at station B as viewed on the line 6—6 of Figure 1.

Figure 7 is a diagrammatic view of the coolant and index motor control circuit.

Figure 8 is a diagrammatic view of the associated fluid control circuit for the tooling elements.

Figures 9, 10, 11 and 12 are diagrammatic views of the electrode servo-feed control circuits for stations A, B, C, and D respectively.

Figure 14:
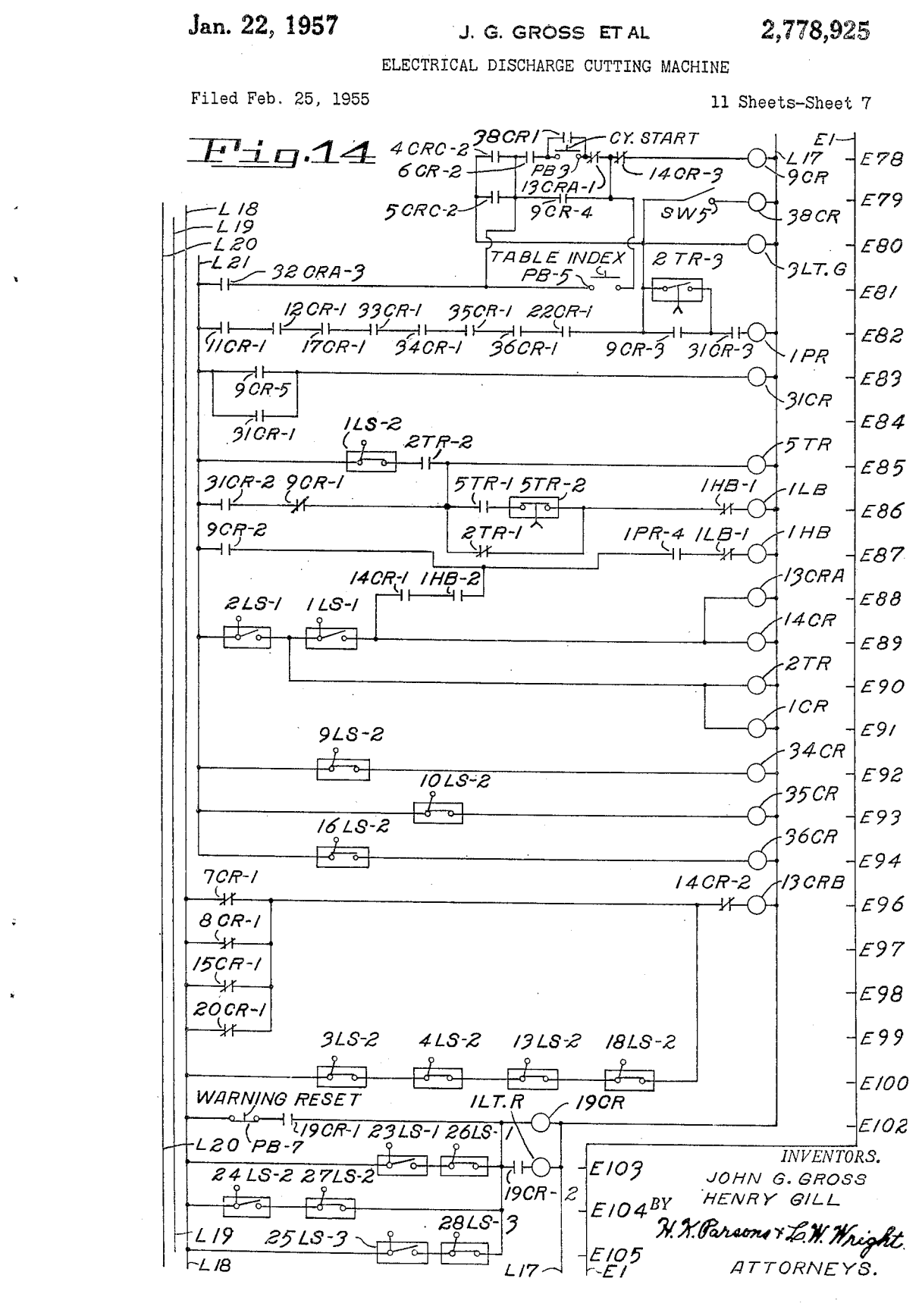
Figure 15:
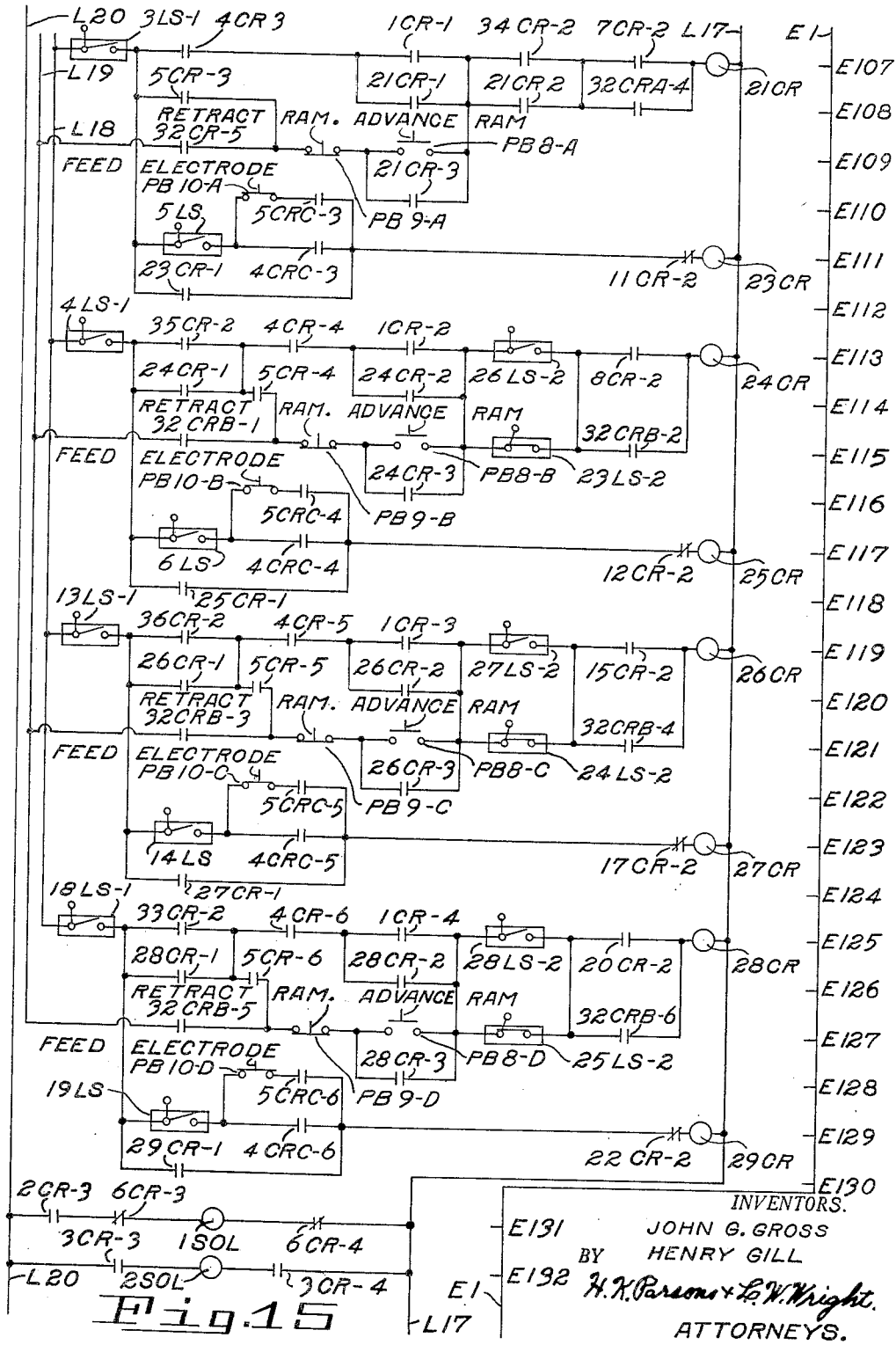

Figures 13, 14, 15, and 16 are diagrammatic views of portions of the machine automatic control circuit.

Figure 17 is an end view of the ram and electrode structure at station A as viewed on the line 17—17 of Figure 2.

Figure 18 is an end view of the electrode structure at station B as viewed on the line 18—18 of Figure 6.

Figures 19, 20, and 21 are diagrammatic views of the control panels of the machine.

Figure 22 is a detail view of the indexing plunger in a retracted position.

Figure 23 is a detail view of the index plate as viewed on the line 23—23 of Figure 2.

Figure 24 is a sectional view of the index plunger mechanism as viewed on the line 24—24 of Figure 2.

Figure 25 is a sectional view of the electrode wear compensator as viewed along the line 25—25 of Figure 2.

Figure 26 is a sectional view through the station selector mechanism as viewed along the line 26—26 of Figure 2.

Figure 27 is a chart showing one complete cycle of operation of the control limit switches of the station selector mechanism.

Figure 28 is a plan view of the dial indicator on the top of the station selector mechanism, as viewed on the line 28—28 of Figure 29.

Figure 29 is a sectional view of the stator selector mechanism as viewed on the line 29—29 of Figure 26.

Figure 30 is an electrical block diagram of the discharge gap control servo-system.

To avoid confusion it might be well to note at the outset that like or similar component parts comprising work stations A, B, C, and D will possess the same reference numeral followed by a letter A, B, C, or D corresponding to the particular work station in reference.

If reference is made to all work stations, in order to expedite a free flowing description, only the reference numeral will be mentioned having no letters following to denote stations A, B, C, and D.

Machine structure

The machine, as shown in Figures 1 and 2 of the drawings, illustrates one embodiment of our invention which consists in general of a base, indicated generally by the reference numeral 10, on which is mounted an indexible table or work support 11. A plurality of tool supports 12 are adjustably mounted on the base 10 in circular guideways 13 for circumferential positioning about the table 11 relative to one another. Said tool supports 12 are locked in their respective adjusted positions by any suitable means, thus forming stations A, B, C, and D as shown in Figure 1 of the drawings. A tool carriage, indicated generally by the reference numeral 14, is slidably mounted on each tool support 12, at stations A, B, C, and D respectively for radial movement to and from the table 11 on sloping guideways 15 formed on the top of tool supports 12 to effect the machining operations.

Since it has been found that heat is generated during the machining operation, the base 10 of the machine, as shown in Figure 2, is provided with a coolant tank or reservoir 16 containing a supply of coolant 27 for dissipating the heat as will later be seen.

Means for supporting the rotatable table 11 on the base 10 comprise an arbor 18 secured to the base 10 above the reservoir 16 by bolts 19 threaded therein; the said arbor 18 having a vertical extending bearing 20 on which the table 11 is journaled which is supported by a shoulder 21 formed thereon resting on a finished bearing surface on the base 10. A worm gear 22 is provided on the lower end of the table 11 in mesh with a power actuable worm 23 for driving the table 11. The worm 23 is attached to the end of an output shaft 24 of a prime mover 25 mounted on the base 10. Therefore, it can be seen that rotation of the shaft 24 by the prime mover 25 will impart rotational movement to the worm 23, and worm gear 22, all of which constitutes power means for indexing the table 11.

As heretofore stated, since heat was generated during the machining operation, means have been provided for submerging the work during the machining operation in a dielectric coolant 27 which not only facilitates heat dissipation but, among other purposes, removes swarf like particles from the scene of the machining operation.

Therefore, a work tank or pan 26 is mounted on the table 11 and secured thereto in any conventional manner, and proper means have been provided whereby the dielectric coolant 27, which is initially stored in the reservoir 16, may be forced into the work tank 26. This means comprises a source of compressed air or the like which is admitted to the closed reservoir 16 through port 28 and for emptying purposes, the air is exhausted through port 29. A feed pipe or tube 30 extends vertically below the coolant level, and is threaded in the lower end of a bore 31 formed in the arbor 18. The bore 31 connects with an interdrilled passage 32 formed in the work table 11 and communicating with the tank 26, whereby if the port 29 is closed and compressed air is admitted through port 28, the coolant 27 will be forced up through the tube 30, through bore 31 and passage 32, into the work tank 26. Conversely, if port 28 is closed and port 29 is opened to release the air pressure, the coolant 27 will drain by gravity from the work tank 26 back into the reservoir 16. Float switches FS-1 and FS-2 are mounted within the reservoir 16 to automatically control the level of the coolant 27 therein as will hereinafter be described more fully.

Two concentric workpieces 33 and 34, such as shown for illustrative purposes only but not confined to such, consisting essentially of four concentric, non-parallel, undulatory or the like walls or work surfaces 35, 36, 37, and 38 are mounted on the work table 11 and secured thereto by means of a vertical extending anchor bolt 39 threaded in the work table 11 and locked thereto by a collar 40 threaded thereon. Two circular mounting brackets 42 and 41 separated by a spacer 43 are mounted slidably on the bolt 39 and rest on the workpieces 33 and 34 respectively. A hand wheel 44 is threaded on the upper end of the bolt 39 such that it now becomes apparent that as the handwheel 44 is rotated, the brackets 42 and 41 will be pressed downward onto the workpieces 33 and 34 respectively and will hold them firmly in position during the machining operation. Rotational movement of the workpieces 33 and 34 with respect to the table 11 is prevented by action of dowel pins 45 and 46 respectively formed on the table 11.

As heretofore stated, the slidable tool carriages, indicated generally by the reference numeral 14 as shown in Figures 2 and 17 of the drawings, are mounted respectively on the sloping guideways 15 formed on the tool supports 12 for movement thereon to and from the work. Each tool carriage 14 consists in general of a power operable upper slide 47 carried by a power operable lower slide or ram 48 guided on the ways 15.

The lower slide or ram 48 is moved by a prime mover, indicated generally by the reference numeral 49, comprising an actuating cylinder 50 mounted on the tool support 12, and a movable piston 51 connected by a piston rod 52 to the slide 48 in any suitable manner.

The upper slide 47 is mounted on guideways 53 formed on the lower slide 48 for feeding movement thereon to and from the work. The upper slide 47 is actuated by a prime mover 54 mounted on the lower slide 48 and secured thereto by any suitable means. With reference to Figures 2 and 8 of the drawings, the shaft 55 of the prime mover 54 carries a pinion gear 56 in mesh with gear 57 on a screw shaft 58 journaled in a bearing member 59 mounted on the lower slide 48. The feed screw 58 is threaded in the upper slide 47 for imparting movement thereto. It can now be seen that this mechanism constitutes means for converting rotary motion of the output shaft 55 of the prime mover 54 into feed movement of the upper slide 47. A tooling element or electrode structure, indicated generally by the reference numeral 60, is attached to and carried by the upper slide 47.

By means of this machine, irregular shaped holes can be cut or formed in an electrical-conductive workpiece by an electrical-discharge machining operation, utilizing an electrode shaped to simultaneously cut at all points around the hole, herein described as trepanning, by emitting a series of electrical discharges across the gap between the tool or electrode and the work surface. Therefore, it is essential that the cutting face of the electrode exhibit a complementary symmetrical relationship with respect to the surface contour of the workpiece to be trepanned.

In addition, as it is also desired to cut a plurality of in-line holes in successive non-parallel undulatory work surfaces having different respective surface contour characteristics, it is necessary to provide a properly faced electrode for each such work surface to be trepanned.

It is obvious that the said successive in-line holes may be cut or formed by utilizing only one tool support or carriage having several electrodes and substituting another tool or electrode for each hole to be cut in the surface before proceeding to cut the next hole in the next work surface, all of which is a time-consuming operation.

It has been found that greatly increased production may be realized by providing one work station, consisting of a tool support operatively carrying an electrode structure, for each work surface to be cut.

Therefore, we have provided a plurality of stations, the number of which equals the number of work walls to be cut, in a circumferentially spaced relation about said work and means to automatically or manually control, either consecutively or simultaneously, the cutting of a plurality of irregular-shaped, in-line holes in successive, non-parallel, undulatory or the like work surfaces that are radially spaced with respect to the center of the table and means to index the table.

With reference to Figure 6 of the drawings, the electrode structure 60 at each station consists in general of a hollow cutting head 61, having a complementary symmetrical cutting face with respect to the work to be trepanned at the particular station, pressed onto a body 62 and held locked thereto by a locking pin 63. The pin 63 is held in position by action of a spring 64 which is secured to the body 62 by a screw 65 threaded therein. The electrode body on support 62 is connected to a shank 66 by bolts 67 threaded in the body 62. The bolts 67 also act as electrical terminals as will later be more apparent. The electrode shank 66 is connected to, but electrically insulated from, a mounting member 68 by bolts 69 threaded therein. The shank 66 is insulated from the mounting member 68 by an insulating strip 70 interposed therebetween, and an insulating tube 71 and washer 72 surrounding the bolts 69. A flange 73, formed on the upper end of the member 68, is attached to the upper slide 47 as will later be more fully discussed.

A source of electrical energy, not shown, is connected to the cutting head 61 of the electrode structure 60 by way of an insulated input terminal 75 threaded in a plate 76 which is mounted on the member 68 in any conventional manner and insulated therefrom by ceramic or the like insulation 77 formed thereon. An insulated conductor 78 connects the input terminal 75 to the bolt 67 by way of bore 79 formed in the member 68 and shank 66. It is now apparent that the electrode cutting head 61 is electrically connected to the input terminal 75 but insulated from the rest of the machine.

As the cutting head 61 of the electrode structure 60 is hollow, there will be an islet of material formed each time a hole is cut in the work. Therefore, means have been provided to grip the islet during the machining operation, and then to remove the islet after the hole has been cut. Said means consists of permanent magnet shoes 80, which are located within the cutting head 61, and connected to a permanent magnet body 81 by screws 82 threaded therein. The magnet body 81 is slidably mounted on a non-magnetic rod 83, of brass or the like, and secured thereon by screw 84 threaded in the end of the rod 83. Rotational movement of the magnetic shoes 80 about the rod 83 is prevented by action of a set screw 85 threaded in the magnetic body 81 riding in a keyway 86 which is formed on the rod 83. Forward pressure is exerted to press the magnetic body 81 against the head of the bolt 84 by action of a spring 87 interposed between a fixed position collar 88 and a slidable beveled collar 89 both of which are mounted on the rod 83. The beveled portion of the collar 89 presses against the magnetic body 81 and gives a "knuckle action" so as to render the shoes 80 self-alignable with respect to the contour of the work surface in the event of any irregularities of the work surface.

The rod 83 is slidably mounted in a bore 90 formed in the electrode mounting member 68 and shank 66 but electrically insulated therefrom by an insulating tube 91 pressed into said bore 90 surrounding the rod 83. The rod 83 is also slidably mounted in a bore 92 formed in the upper slide 47 and rotational movement of the rod 83 therein is prevented by action of a set screw 93 threaded in the upper slide 47 and riding in a keyway 94 formed along the rod 83. The said rod 83 is also slidably mounted in a bore 95 formed in a support member 96 on the lower slide 48.

In order for the islet, that is formed during the machining operation, to be accessible and easily removed after the hole has been cut, means have been provided whereby the magnetic shoes 80 may be extended beyond the face of the electrode cutting head 61. Said means comprise a spring 97 interposed between the member 96 and a collar 98 secured on the rod by a set screw 99 threaded in the collar 98. The maximum forward movement of the rod 83, thence the magnetic shoes 80, is adjustable by action of lock nuts 100 threaded on the end of the rod 83. Power actuable means have been provided whereby the rod 83, thence the shoes 80, may be clamped into a fixed position during the machining operation so that feeding movement of the electrode structure 60 will not also cause feeding movement of the shoes 80. Said means comprise a diagonally extending plate structure 101 mounted on the lower slide 48 and secured thereto by bolts 102 threaded therein. A housing 103 containing a cylinder 104 is mounted on the plate 101 and secured thereto by bolts 105 threaded therein. A movable piston 106 is slidably mounted in the cylinder 104 but is held in a normally retracted position by action of a spring 107 interposed between the housing 103 and the piston 106. A port 108 connects the cylinder 104 to a source of compressed air or the like, not shown, so that as compressed air is emitted into the port 108, the piston 106 will be moved upward and conversely as the compressed air is removed, the piston 106 will be retracted by action of the spring 107. The piston 106 is connected to a plunger 109 by a dowel pin 110. The plunger 109 is slidable in a bore 111 formed in the member 96 such that the face of the plunger 109 may be pressed against a flat surface 112 formed on the rod 83. Rotation of the plunger 109 is prevented by action of a pin 113 held by the plate 101 which rides in a keyway 114 formed on the plunger 109. Therefore, it can be seen that as long as compressed air is emitted to the port 108, the plunger 109 will be forced against the rod 83 in such a manner that axial movement of the rod will be prevented and thus will be held locked in position.

As heretofore stated, it is necessary for the cutting face of the electrode structure 60 to exhibit a complimentary symmetrical relationship with respect to the respective work surface to be cut. Therefore, the contact surface of the permanent magnet shoes 80, in order to adhere to the islet during the machining operation and then remove said islet after the hole has been cut, must also exhibit a complementary symmetrical relationship with respect to the work surface to be cut. With reference to Figures 2, 3, 4, and 5 of the drawings, it can be seen that the face of the electrode cutting head 61 and the contact face of the magnet shoes 80 at stations A, B, C, and D are complementary symmetrical with respect to the individual work surfaces 35, 36, 37, and 38, respectively.

Again, it can be seen from Figures 1 and 2 of the drawings that in order for the electrode cutting head 61 at station B to be traversed into cutting position with respect to the work surface 36, it must first pass through the hole previously cut in the work surface 35 by the electrode cutting head 61 at station A. In order for the electrode cutting head 61 at station C to be traversed into cutting position with respect to the work surface 37, it must first pass through the holes previously cut in the work surfaces 35 and 36 by the electrode cutting heads 61 at stations A and B respectively. And, again, in order for the electrode cutting head 61 at station D to be traversed into cutting position with respect to the work surface 38, it must pass through the holes previously cut in the work surfaces 35, 36, and 37 by the electrode cutting heads 61 at stations A, B, and C respectively.

Therefore, safety means has been provided for the electrode structures 60 at stations B, C, and D to cause immediate retraction of the upper slide 47 in the event that the electrode cutting head 61 encounters an obstruction in passing through a previously cut hole while traversing into cutting position with respect to its respective work surface. Said means utilizes the forward extension of the magnetic shoes 80 as the detecting element and, in addition, limit switches 23LS, 24LS, and 25LS shown in Figure 6, are provided at stations B, C, and D respectively. Each limit switch is attached to its respective electrode mounting member 68 and secured thereto by bolts 115 threaded therein. Each limit switch is provided with an actuator 116 which is operated by a dog 117 formed on the rod 83. Therefore, it can be seen that axial movement of the rod 83 will actuate its respective limit switch. Means have also been devised to overrule the effect of the limit switches 23LS, 24LS and 25LS when the magnetic heads 80 contact the desired work surface to be cut as will later be seen in connection with the description of the associated electrical circuitry.

A clearer understanding of the aforementioned safety device will be had upon analysis of the electrical system to be described subsequently in the following specifications.

Indexing mechanism

As heretofore stated, the work table 11 is rotatably indexed by means of a worm 23 driven by a prime mover 25 as shown in Figure 2 of the drawings. The work table 11 has been provided with a "positive stopping" means, indicated generally by the reference number 118, whereby the plurality of angularly-spaced holes cut during the machining operation may be accurately and precisely indexed to their next position. Said means comprises in general (with reference to Figure 24 of the drawings), an actuable indexing plunger 119 slidably mounted in a bore 120 formed in the base 10. Rotation of the plunger 119 within the bore 120 is prevented by action of a screw 121 which is threaded in the base 10 riding in a keyway 122 formed along the lower side of the plunger 119. The plunger 119 is held in a normally extended position after the index has been completed, as shown, by action of a spring 123 located in the bore 120 and interposed between the lower end of the plunger 119 and a mounting plate 124 which is secured to the base 10 by bolts 125 threaded therein. Vertical movement of the plunger 119 is guided by a guide pin 126 threaded in the plate 124 and locked thereto by a locknut 128 and slidable in a bore 127 formed in the lower end of the plunger 119.

Two spring return limit switches 1LS, and 2LS, whose function will be more fully described subsequently in connection with the associated electrical circuitry, are mounted on a support member 129 and secured thereto by bolts 130 and 131 respectively threaded therein. The said support member 129 is secured to the base 10 by bolts 132 threaded therein. An extending actuating arm 133 of the limit switch 1LS is actuable by movement of a plunger 134 which is slidably mounted in a bore 135 formed in the support member 129. The plunger 134 tends to be held in a retracted position by action of a spring 136, positioned about the plunger 134 in the bore 135 and interposed between a collar 137 formed on the plunger 134 and a plate 138 secured to the support member 129 by bolts 139 threaded therein. A cam surface 140 is formed on the side face of the index plunger 119 in such a manner that if the index plunger 119 is moved downward, the plunger 134 will be forced to the right against the cam 140 by action of the spring 136, and thus the limit switch 1LS will be actuated thereby.

An extending lever arm 141 of the limit switch 2LS is actuable by movement of a plunger 142 slidably mounted in a bore 143 formed in the index plunger 119. The plunger 142 tends to be held in a retracted position by action of a spring 144 positioned about the plunger 142 within the bore 143 and interposed between a collar 145 formed on the end of the plunger 142 and a plate 146 secured to the index plunger 119 by bolts 147 threaded therein. Rotation of the plunger 142 is prevented by a key 148 formed on the plate 146 riding in a keyway 149 formed along the plunger 142. The right end of the collar 145 of the plunger 142 is beveled so that axial movement thereof will vertically move a second beveled plunger 150 contacted thereto and slidably mounted in a bore 151 formed in the index plunger 119. The upper end of the plunger 150 is also beveled so that vertical movement thereof will horizontally move a third beveled plunger 152 contacted thereto and slidably mounted in a bore 153 also formed in the index plunger 119. The opposite end of the plunger 152 extends beyond an accurately machined face 155 formed on the plunger as shown in Figure 22.

When the table index is complete as shown in Figure 24 of the drawings, the index plunger 119 will be extended upward by the spring 123 and into one of a plurality of circumferentially spaced slots 154 formed on the table 11, each slot having an accurately machined face 154A as shown in Figure 23 of the drawings. Therefore, it can be seen that as the table 11 is rotated to the left or clockwise, the index plunger 119 will be forced downward by action of the sloping portion of the slot 154 and the plunger 142 will be moved to the right by action of the spring 144 and, in turn, will force the plunger 150 upward which in turn will move the plunger 152 outward to a position as shown in Figure 22 of the drawings. As the plunger 142 is moved to the right, the limit switch 2LS will be actuated thereby. As the index plunger 119 continues downward, the limit switch 1LS will also be actuated as heretofore shown. Conversely, when the plunger 119 is moved upward, the procedure will be reversed. Therefore, it can also be seen that the accurately machined face 155 of the index plunger 119 being in contact with the accurately machined face 154A of the slots 154, after the index has been completed, acts as a positive stop for the table 11 and gives an accurate and precise positioning mechanism. The number and angular position of the slots 154 thus formed on the index plate 11, will be dependent upon the desired sequence of angular spacing between the holes or slots to be machined in the work. The index plate as shown in Figure 23, as an example only, shows that the aforementioned holes or slots which are to be cut in the work piece will exhibit a 45 degree space relationship with respect to each adjacent hole or slot if the indexing plate of the type as shown in Figure 23 is used. Therefore, the index plate may be made to be easily removable and another index plate of the desired configuration may be substituted in its stead.

Pneumatic circuitry

With reference to Figure 8 of the drawings, each station, A, B, C, and D, is provided with a rapid traversing means to control movement of the lower slide or ram 48. As heretofore stated, the rams 48 are actuated by a power actuable cylinder 50 containing a movable piston 51 connected to the ram 48 by a connecting rod 52.

Each station, A, B, C, and D, is provided with a reversing control valve 156 containing a valve plunger 157 having grooves 158 and 159 formed thereon. The plunger 157 is connected to a power operable solenoid 4SOL, 5SOL, 6SOL, or 7SOL at stations A, B, C, and D, respectively, by a connecting rod 160 in such a manner that the plunger 157 will be moved to the right within the cylinder 156 each time the solenoid 4SOL, 5SOL, 6SOL or 7SOL is energized to the position as shown in Figure 8. The plunger 157 is normally held in a retracted position (to the left) when the solenoid is deenergized, by action of a spring 161 positioned about the rod 160 and interposed between the valve 156 and a collar 162 formed on the rod 160.

Each valve 156 is provided with a pressure port 163, exhaust ports 164, 165, and motor ports 166, and 167.

The port 167 is connected to port 168 of cylinder 50, by means of line 169, and parallel connected throttle valve 170 and check valve 171. The port 166 is connected to port 172 by means of line 173 and parallel connected throttle valve 174 and check valve 175. The exhaust ports 164 and 165 of the valve 156 are connected by line 176 to the atmosphere through parallel connected throttle valve 179 and check valve 178.

The pressure port 163 of valve 156 is connected to a pressure source 180 through line 181, a pressure regulator 1PS and filters 183.

Therefore, it can be seen if either solenoid 4SOL, 5SOL, 6SOL, or 7SOL is energized, as shown in Figure 8, the plunger 157 at that particular station will be moved to the extreme right of valve 156 as shown such that the compressed air or the like as supplied by the pressure source 180 to the pressure port 163, will enter the groove 159 and flow through port 166, line 173, and throttle valve 174 into port 172 of the cylinder 50 to move the piston 51 and ram 48 forward at a throttled traverse rate to be determined by adjustment of the throttle valve 174. Positive stopping means have been devised to limit said advancement as will be later shown.

Conversely, if any solenoid 4SOL, 5SOL, 6SOL, or 7SOL which was originally energized, is now deenergized, the piston 157 will be returned to its normal position by action of the spring 161. Thus, compressed air will enter the groove 158, and flow through port 167, line 169, and check valve 171 into port 168 of cylinder 50. The piston 51 and ram 48 will be retracted back to the original starting position, which is determined by a positive stopping means, at a rapid traverse rate.

Each station A, B, C, and D is provided with a valve 184 as shown in Figure 8 containing a valve plunger 185 having a groove 186 formed thereon. The plunger 185 is connected to a power operable solenoid, 8SOL, 9SOL, 10SOL, and 11SOL at stations A, B, C, and D respectively, by a connecting rod 187 in such a manner that the plunger 185 at the respective station will be moved to the right within the cylinder 184 each time the solenoid is energized to the position as shown in Figure 8. The plunger 185 is normally held in a retracted position (to the left) by action of a spring 188 positioned about the rod 187 and interposed between the valve 184 and a collar 189 formed on the rod 187.

Each valve 184 is provided with a pressure port 190 and ports 191 and 192 formed therein. The port 191 is connected to the pressure port 108 of the locking cylinder 103 by line 193. The other port 192 is connected to atmosphere through line 194 and parallel connected throttle valve 195 and check valve 196. The pressure port 190 is connected to the pressure source 180 through line 197, the pressure regulator 1PS and filters 183.

Therefore, it can be seen that if either solenoid 8SOL, 9SOL, 10SOL or 11SOL is energized, as shown in Figure 8, the plunger 185 at the respective work station will be moved to the extreme right within the valve 184 such that the compressed air will enter the groove 186 and flow through port 191, line 193, and port 108 to the locking cylinder 103 as heretofore described such that the plunger 111 will be moved upward to lock the safety rod 83 in position and maintain a constant fluid pressure thereon.

Conversely, if the solenoid 8SOL, 9SOL, 10SOL, or 11SOL, which was originally energized, is now deenergized, the valve plunger 185 will be moved to the left and returned to its normal position by action of the spring 188. The pressure port 190 of valve 184 will be closed and ports 191 and 192 interconnected so that the pressure in the line 193 will exhaust through valve 195 and the spring 107 will force the plunger 111 downward, thus unlocking the safety rod 83.

After each loading of the work table, the dielectric coolant 27, originally stored in the reservoir 16, is forced up into the work tank 26 by air pressure admitted to said reservoir 16 through the pressure port 28 formed therein. The pressure source 180 is connected to the pressure port 28 through a feed line 198, series connected power actuable valves 199 and 201 and a throttle valve 200. The feed line 198 is connected to exhaust through branch line 202 and a normally closed power actuable valve 203. The valves 199 and 203 are normally closed and are actuated by energization of solenoids 1SOL and 3SOL respectively and will remain open as long as either solenoid remains energized, whereas valve 201 is normally open and will be closed when the solenoid 2SOL is energized. The port 29 of the reservoir 16 is connected to a pressure regulator valve 204 which is adjustable to regulate the pressure in the tank.

Therefore, it can be seen that if solenoid 1SOL is energized, thus opening the valve 199, and with valve 201 normally open and valve 203 normally closed, the compressed air from the pressure source 180 will be fed through the feed line 198 into the reservoir 16 through the pressure port 28, thus forcing the dielectric coolant 27 up into the worktank 26.

Conversely, if the solenoid 1SOL is deenergized, the valve 199 will close, and if the solenoid 3SOL is energized, the valve 203 will open, therefore releasing the air pressure so that the dielectric coolant 27 will drain by gravity from the worktank 26 back into the reservoir 16.

Of course, if the valve 201 is closed as when 2SOL is energized, then the air pressure from the source 180 cannot be admitted to the reservoir even though the solenoid 1SOL is energized which is the condition that exists in the "tank draining" operation as will later be shown.

In order to coordinate the desired cycles of machining operation for each work station either manually or automatically, an electrical control circuitry has been provided to render the machining operation universal in point of adaptability to meet the great diversities of cycles of operation demanded by the necessities of the different manufacturing needs.

Such an electrical control circuit is shown in Figures 9 through 16 of the drawings. Again, with reference to Figure 8 of the drawings, stations A, B, C, and D are provided with a plurality of dog actuable limit switches, 1LS through 28LS, which are electrically connected in the aforementioned control circuit and the function of each will be mentioned and described in connection with the aforesaid circuit by way of an actual working condition.

In order to facilitate location of electrical components and description of the following electrical circuit, it will be noted that Figures 9 through 16, which comprise the circuit, have been provided with a linear numerical scale E1 on the right edge of each figure, forming horizontal consecutively numbered lines from E2, Figure 9, to E141, Figure 16. Therefore, it can be seen that each electrical component will be located on one of said lines from E2 to E141.

It will be assumed that all electrodes and rams are in a fully retracted position, herein called the "starting position," so that after the work has been clamped in position, the machining cycle is as follows:

*Filling the work tank*

When the main power switch SW-1 shown in Figure 7 of the drawings is closed, feed lines LL1, LL2, and LL3 connected thereto will be energized from a source of three phase A. C. power. Single phase power is taken from lines LL1 and LL2, which are extended to Figure 13, to energize a single phase transformer T-1 located on the line E52 of Figure 13, the secondary of which is connected to feed lines L17, L19, and L20. Overload relays OLA1, OLA2, 1SS and 2SS on line E52 are series connected in the feed line L19 for safety.

If the reservoir 16 is initially full of dielectric coolant 27, the float switch FS-2, shown in Figures 2 and 8, will have its normally open contacts shown on line E54, closed, and a relay coil 30CR also on line E54 will be energized. As the coil 30CR is energized, contacts 30CR-1 on line E53 will close, and contacts 30CR2 on line E58 will open. As the contacts 30CR-1 are closed, a "tank fill" push button PB1, also shown in Figure 20, may be actuated which will energize the relay coil 2CR. As the coil 2CR is energized, contacts 2CR-1 on line E54 will close, maintaining coil 2CR energized. Contacts 2CR-2 on line E59 will close, permitting the "cycle start" circuit to be energized, and contacts 2CR-3 on line E131 will close, energizing solenoid 1SOL, causing the work tank to fill.

As the coolant 27 is forced into the work tank 26, a critical "low level" is reached which closes a float switch FS3 on line E56, located within the work tank 26, as shown in Figure 8, to maintain the coolant level within the work tank 26 above the critical low level. The coolant 27 continues to be forced into the work tank 26 until it reaches a low level in the reservoir 16, causing operation of float switch FS1 on line E56, whereby the closing of both switches FS1 and FS3 energizes a relay coil 6CR which will remain so energized as long as the coolant 27 within the work tank 26 is above the preset critical "low level."

When the coil 6CR is energized, contacts 6CR-1 on line E60 will close, and thus energize a relay coil LEA on line E65; interlock switch contacts 6CR-2 on line E78 in series with push button PB3 will close so as to make the "cycle start" operation possible when certain other interlock contacts close; contacts 6CR-3 and 6CR-4 on line E131 will open and thus the solenoid 1SOL will be deenergized and thereby close valve 199 in Figure 8 which stops the air from being forced into the reservoir 16. Therefore, it can be seen that the action of the solenoid 1SOL also maintains a constant air pressure in the reservoir 16 and a predetermined coolant level is maintained in the work tank 26.

When the coil LEA on line E65 is energized, contacts LEA-1 on line E64 will close, maintaining coil LEA energized, and contacts LEA-2, LEA-3 and LEA-4 shown in Figure 7, will close and start a three phase coolant circulator motor 205 which circulates the coolant 27 in the work tank 26. The machining cycle is now ready to be started.

*Indexing cycle (a)*

The index cycle is started by pushing the "cycle start" push button PB2 on line E60, Figures 13 and 20, completing a circuit to the relay coil 4CRC on line E60 through the selector switch SW-2, line E60, set on semi-automatic and pressure regulating switch 1PS, which is closed when the air pressure is on. As the coil 4CRC is energized, contacts 4CRC-1 in line E59 close and energize the relay coil 4CRB; contacts 4CRC-2 on line E78 close and energize the relay coil 4CRB; contacts 4CRC-2 on line E78 close, setting up circuit to relay coil 9CR; contacts 4CRC-3 in line E111 close; contacts 4CRC-4 in line E117 close; contacts 4CRC-5 in line E123 close; and contacts 4CRC-6 in line E129 close.

When the coil 4CRB in line E59 is energized, contacts 4CRB-1 in line E58 close, thus energizing the relay coil 4CRA; contacts 4CRB-2 in line E57 open to prevent operation of relay 3CR by drain switch PB4; and contacts 4CRB-3, 4CRB-4, 4CRB-5, and 4CRB-6 in lines E8, E16, E26, and E34 respectively also close to set up potential circuits.

When relay coil 4CRA in line E58 is energized, contacts 4CRA-1 in line E57 close and energize the relay coil 4CR; contacts 4CRA-2, 4CRA-3, 4CRA-4, and 4CRA-5 in lines E4, E13, E23, and E31 close to set up potential circuits, and contacts 4CRA-6 in line E71 open to prevent operation of the relay coils 32CRA and 32CRB.

When the relay coil 4CR on line E57 is energized, its contacts 4CR-1 in line E61 close to latch the circuit around push button PB2; contacts 4CR-2 on line E66 close to energize the feed line L18; and contacts 4CR-3, 4CR-4, 4CR-5, and 4CR-6 in lines E107, E113, E119, and E125 respectively close to set up potential circuits.

As the upper slides start to retract, the limit switches 7LS, 8LS, 15LS and 20LS of the respective slides close and relays 7CR, 8CR, 15CR and 20CR in lines E67, E68, E69, and E70 are energized, thus opening the normally closed contacts 7CR-1, 8CR-1, 15CR-1 and 20CR-1 in lines E96, E97, E98, and E99 connected in parallel to relay 13CRB.

Attention is invited to the fact that relay 13CRB in line E96 is coupled to relay 13CRA in line E88 in the sense that they have a common unbiased armature, and the electro-magnetic coil of relay 13CRB attracts the armature in one direction, and the coil of relay 13CRA attracts it in the other direction, and the armature remains in either position after the attracting coil is deenergized. The common armature or switch is designated as 13CRA-1 in line E78 and located in the starting and stopping circuit for the index motor.

Since all the lower slides are retracted at the start, the limit switches 11LS, 12LS, 17LS, and 22LS on lines E73, E74, E75, and E76 respectively are closed, energizing relays 11CR, 12CR, 17CR, and 22CR on lines E73, E74, E75, and E76 respectively.

These relays close contacts 11CR-1, 12CR-1, 17CR-1, and 22CR-1 respectively on line E82 which form interlocks in the circuit to the index motor starting relay 1PR.

When the upper slides finish their retractive movement, they operate limit switches 9LS, 10LS, 16LS and 21LS which open contacts 9LS-1, line E7; 10LS-1, line E5; 16LS-1, line E25; and 21LS-1, line E33 respectively, which are in the station circuits shown in Figures 9, 10, 11 and 12. These relays also close contacts 9LS-2, line E92; 10LS-2, line E93; 16LS-2, line E94, and 21LS-2, line E77 respectively, thereby energizing relays 34CR, 35CR, 36CR, and 33CR which, in turn, close interlock contacts 34CR-1, 35CR-1, 36CR-1 and 33CR-1 in the circuit to the power relay 1PR in line E82 for the index motor.

The closing of all these interlock switches, completes a circuit to illuminate a green panel light 3LT-G in line E80 to signal to the operator that all the slides are in return position, and the machine is ready to be indexed.

The closing of these switches also completes a branch circuit to switch 4CRC-2 in line E78 which is closed because the air pressure is turned on, and then to 6CR-2 which is closed because the coolant tank is full whereby the closing of push button switch PB3, also in line E78, will complete the circuit to relay 9CR.

The "cycle start" push-button PB2 on line E60 and the "cycle start" push-button PB3 on line E78 have a common actuating shaft so that actuation of push button PB2 also caused closure of push-button PB3. Thus, the operation of PB2 not only closed contacts 6CR-2 and 4CRC-2, but also closed "cycle start" push-button PB3 to complete the circuit to relay coil 9CR. As the coil 9CR is energized, contacts 9CR-1 on line E86 will open to prevent operation of relay coil 1LB and contacts 9CR-2 on line E87 will close to permit operation of the relay coil 1HB which coils determine the direction of rotation of the index motor, see Figure 7. Contacts 9CR-3 on line E82 will close to complete circuit to relay coil 1PR when 31CR-3 closes; contacts 9CR-4 on line E79 close to latch circuit around the push-button PB-3, and contacts 9CR-5 on line E83 will close and operate relay coil 31CR.

When the coil 31CR is energized, latching contacts 31CR-1 on line E84 will close to maintain the coil 31CR energized; contacts 31CR-2 on line E86 close, and contacts 31CR-3 on line E82 close to operate relay coil 1PR.

As the coil 1PR is energized, contacts 1PR1, 1PR2, and 1PR3, as shown in Figure 7, close to short out the series resistors 3R, 2R, and 1R respectively, and contacts 1PR–4 on line E87 close to energize relay coil 1HB and thus start rotation of the index motor.

When the coil 1HB is energized, contacts 1HB–1 on line E86 will open to prevent operation of relay coil 1LB, contacts 1HB–2 on line E88 will close so that the coil 1HB may remain energized, contacts 1HB3, 1HB4, 1HB5, 1HB6, and 1HB7, shown in Figure 7, will close and will energize the index motor 25 thereby such that a high torque will be applied to said motor 25, which will rotate the work table 11 in a clockwise direction as viewed in Figure 1 or to the left as shown in Figure 24.

As the work table 11 leaves its home position, the plunger 119 will be forced down, releasing limit switches 2LS and 1LS, whereby their contacts 2LS–1 and 1LS–1 on line E89 will close. Limit switch 2LS–1 will energize relay coils 2TR and 1CR on lines E90 and E91 respectively.

As the coil 2TR is energized, contacts 2TR–1 on line E87 open to prevent the relay coil 1LB on line E86 from being energized; contacts 2TR–2 on line E85 close but 1LS–2 opens; contacts 2TR–3 on line E81 close instantly to maintain the coil 1PR energized but will be timed-open when the coil 2TR is deenergized; contacts 2TR–4 on line E133 open instantly to prevent the ram advance solenoids 4SOL, 5SOL, 6SOL, and 7SOL from being energized before the index is complete and will be timed-closed when the coil 2TR is deenergized.

As the coil 1CR is energized, it will close contacts 1CR–1 on line E107, contacts 1CR–2 on line E113, contacts 1CR3 on line E119, and 1CR–4 on line E125 to set up future circuits.

Limit switch 2LS also has normally closed contacts 2LS–2 on line E133, which are opened to prevent operation of the ram advance solenoids 4SOL, 5SOL, 6SOL, and 7SOL during indexing.

Closing of limit switch 1LS–1 on line E89, will energize the relay coils 14CR and 13CRA.

As the coil 14CR is energized, contacts 14CR–1 on line E88 close to maintain the relay coil 1HB energized; contacts 14CR–2 on line E96 open to prevent the relay coil 13CRB from being energized; and contacts 14CR–3 on line E78 open; thereby deenergizing the relay coil 9CR.

As the coil 13CRA is energized, contacts 13CRA–1 on line E78 open to prevent two successive indexes.

As the coil 9CR on line E78 is deenergized, contacts 9CR–1 on line E86 close; contacts 9CR–2 on line E87 open but the relay coil 1HB remains energized, contacts 9CR–3 on line E82 open but the relay coil 1PR remains energized, contacts 9CR–4 on line E79 open to prevent the relay coil 9CR from being energized; and contacts 9CR–5 on line E83 open but the relay coil 31CR remains energized.

As the work table 11 continues to rotate to the left, the plunger 119 will move upward and fall in the following slot 154 on the work table 11, therefore the limit switch 1LS–1 on line E89 will open, thereby deenergizing the relay coils 14CR and 13CRA on line E89 and E88 respectively and also deenergize the relay coil 1HB on line E87.

As the coil 14CR is deenergized, contacts 14CR–1 on line E88 open to prevent the relay coil 1HB from being energized; contact 14CR–2 on line E96 closes and energizes the relay coil 13CRB; and contacts 14CR–3 on line E78 close.

As the relay coil 13CRA is deenergized, contacts 13CRA–1 on line E78, being provided with an interlock, do not close until the relay coil 13CRB on line E96 is energized but now that 13CRB is energized, the contacts 13CRA–1 on line E78 close to permit the relay coil 9CR to be energized later.

As the coil 1HB on line E87 is deenergized, contacts 1HB–1 on line E86 close; contacts 1HB–2 on line E88 open to prevent the relay coil 1HB from being energized; and contacts 1HB3, 1HB4, 1HB6, and 1HB7, shown in Figure 7, open to stop the index motor 25 and permit its reversal.

Also, as the plunger 119 in Figure 24 falls into the following slot 154 on the work table 11, the limit switch 1LS–2 on line E85 closes and energizes the relay coil 5TR.

As the relay coil 5TR is energized, contacts 5TR–1 close and energize the relay coil 1LB to reverse the index motor but the contacts 5TR–2 also on line E86 do not open immediately but are timed to open at a specific time as will later be seen.

As the relay coil 1LB is energized, contacts 1LB–1 on line E87 open to prevent the relay coil 1HB from being energized, and contacts 1LB2, 1LB3, and 1LB4, shown in Figure 7, close and reverse the phase of the input voltage to the index motor 25 and also to connect the low speed winding of the motor 25 to the feed lines LL1, LL2, and LL3. Therefore, the index motor 25 will reverse direction of rotation and rotate at a low speed. As the index motor 25 now drives the table 11 to the right, see Figure 24, the face 154A of the slot 154 will come into contact with the face 155 of the plunger 119 and thus the limit switch 2LS will be actuated.

Therefore, the limit switch 2LS–1 on line E89 will open, deenergizing the relay coils 2TR and 1CR. As the coil 2TR is deenergized, contacts 2TR–1 on line E87 close and after such time the time-actuated contacts 5TR–2 on line E86 open, but the relay coil 5TR remains energized; contacts 2TR–3 on line E81 do not open immediately as they are time-opened contacts; and contacts 2TR–4 on line E133 do not close immediately as they are time-closed contacts.

As the relay coil 1CR on line E91 is deenergized, contacts 1CR–1 on line E107 open; contacts 1CR–2 on line E113 open; contacts 1CR–3 on line E119 open; and contacts 1CR–4 on line E125 open.

The time-open contacts 2TR–3 on line E81 now open and thereby deenergize the relay coil 1PR which open contacts 1PR1, 1PR2, and 1PR3, shown in Figure 7, thus inserting the resistors 1R, 2R, and 3R in series with the index motor power leads so that the index motor 25 will continue to apply a holding-torque against the positive stops, and timed contacts 2TR–4 on line E133 now close, thus illuminating the clear light 2LT–C, also shown in Figure 20, indicating that the index is now complete.

*Station selector mechanism*

In order that the work stations A, B, C, and/or D may be properly selected to perform the desired sequence of operation, a turret-actuated limit switch means, such as shown in Figure 29 of the drawings and indicated generally by the reference numeral 205, has been devised which consists essentially of a housing member 206 mounted on the base 10 and secured thereto by bolts 207 threaded therein. A vertical shaft 208 is journaled in bores 209 and 210, which are located in either end of the housing 206. A sleeve member 211 is pressed onto the shaft 208 and rotational movement thereabout is prevented by action of a screw 212 threaded in the sleeve 211 riding in a keyway 213 formed along the lower end of the shaft 208. A plurality of cams, 214, 215, 216, and 217 (one for each station A, B, C, and D respectively) separated by spacers 218 are pressed onto the sleeve 211, and rotational movement thereabout is prevented by action of a key 219 integral therewith and a lock nut 220 threaded on the upper end of the sleeve 211. It is to be understood that the said cams 214, 215, 216, and 217 are easily removable so that other cams, the number of which equals the number of work stations, having a different surface contour may be substituted to conform to a different desired cyclic operation of the work stations A, B, C, and/or D.

A plurality of actuable limit switches 3LS, 4LS, 13LS, and 18LS, the number of which equals the number of said work stations, are provided and are secured to the housing 206 in any suitable manner. Actuating plungers 221, 222, 223, and 224 of the limit switches 3LS, 4LS, 13LS, and 18LS respectively are held in contact with the surface contour of the cams 214, 215, 216, and 217 respectively by action of a spring 225, see Figure 26, interposed between a collar 226 formed on the plungers 221, 222, 223, and 224, and the housing member 206.

Ratcheting means have been provided to ratchet said cams 214, 215, 216, and 217 in synchronism with the indexing of the work table 11 from station to station. However, each time the table is indexed 45 degrees, the cams are indexed only 22½ degrees. With reference to Figure 26 of the drawings, the said means consists essentially of a ratchet wheel 227 pressed onto the sleeve 211 and secured thereto by action of the key 219 integral therewith or any other suitable means. A ratchet pawl 228 engages the wheel 227 and is pivoted on a pin 230 formed on a plunger member 229 which is axially slidable in bores 231 and 232 formed in either side of the housing 206. A spring 233 interposed between a slidable collar 234 on the plunger 229 and the housing 206 tends to keep the plunger 229 in a normally extended position or to the right as shown in Figure 26. The maximum forward extension of the plunger 229 is governed by contact action of a collar 235, formed on the said plunger 229, with the housing 206.

Additional means have been provided for locking the cams 214, 215, 216, and 217 into each ratcheted position after the table 11 has been indexed. Said means consists essentially of a detent wheel 236 also pressed onto the sleeve 211 and secured thereto by action of the key 219 integral therewith or any other suitable means. A detent arm 237 engages the wheel 236 and is pivoted about a pin 238 formed on an extension of the housing 206. Diametrically opposed springs 239 and 240 connected to the detent arm 237 and to either side of the housing 206 tend to restore the detent arm 237 to its inital locking position.

Therefore, it is now evident that if the plunger 229 is actuated, such as being moved to the left as shown in Figure 26, the cams 214, 215, 216, and 217 will be ratcheted one position clockwise and then each time will be locked into position by action of the detent arm 237.

The shape of the cams 214, 215, 216 and 217 will be dependent upon the desired sequence of operations at the work stations. For example: assuming that there are four concentric work surfaces, 35, 36, 37, and 38, as shown in Figure 2, and it is desired to machine eight radial holes through each set of four work surfaces, the contour of cam 114, at station A, Figure 27, would consist of eight consecutive high points ($a$) through ($h$) measured counterclockwise, followed by eight consecutive low points ($i$) through ($p$); cam 215 at station B would have a contour consisting of eight consecutive high points, also measured counterclockwise, ($b$) through ($i$) followed by eight consecutive low points ($j$) through ($a$); cam 216 at station C would have a contour consisting of eight consecutive high points ($c$) through ($j$) followed by eight consecutive low points ($k$) through ($b$), and cam 217 at station D would have a contour consisting of eight consecutive high points ($d$) through ($k$) followed by eight consecutive low points ($l$) through ($c$).

Therefore, it is now apparent that the actual contour of the cams 214, 215, 216, and 217 are identical with one another, but are angularly displaced from one another, that is, cam 215 follows cam 214 by 22½ degrees, cam 216 follows cam 214 by 45 degrees, and cam 217 follows cam 214 by 67½ degrees. Since it is desired to cut eight holes, the table 11 is provided with eight dogs 241 which are spaced at 45 degree intervals about the circumference of the said table 11.

With reference to the chart in Figure 27, as the table 11 is rotated from its starting position to its first working position, corresponding to 45 degrees clockwise, the dog 241, also shown in Figure 2, will actuate the plunger 229, and the cams 214, 215, 216, and 217 will be rotated 22½ degrees clockwise to the starting point at ($a$) and the limit switch 3LS will be actuated by the cam 214 as shown, but limit switches 4LS, 13LS, and 18LS will not be actuated. As the table 11 is rotated another 45 degrees clockwise, the cams 214, 215, 216, and 217 will rotate 22½ degrees clockwise to point ($b$) and the limit switch 3LS will remain actuated and the limit switch 4LS will also be actuated by the cam 215, but the limit switches 13LS and 18LS will not be actuated. As the table 11 is rotated another 45 degrees clockwise, the cams 214, 215, 216, and 217 will rotate 22½ degrees clockwise to point ($c$) and the limit switches 3LS and 4LS will remain actuated, whereas the limit switch 13LS will also be actuated, but the limit switch 18LS will not be actuated. As the table 11 is rotated another 45 degrees clockwise, the cams 214, 215, 216, and 217 will rotate 22½ degrees clockwise to point ($d$) where all limit switches 3LS, 4LS, 13LS, and 18LS will be actuated and will so remain from points ($d$) through point ($h$). At point ($i$) the limit switch 3LS will be released, at point ($j$) the limit switches 3LS and 4LS will be released; at point ($k$) the limit switches 3LS, 4LS, and 13LS will be released and at point ($l$) all limit switches 3LS, 4LS, 13LS, and 18LS will be released and the eight sets of radially-spaced in-line holes will now be machined.

In order to machine a second set of work surfaces, the cams 214, 215, 216, and 217 must be rotated back to the starting point at ($p$). Therefore, manual and electrical means have been provided to rotate the same cams back into starting position. The manual means consists essentially of an indicating dial 242 pressed onto the shaft 208 which indicates the stations A, B, C, and/or D which have been activated, and a control knob 243 which is also pressed onto the shaft 208 to effect rotation of the cams 214, 215, 216, and 217. The aforementioned electrical means have heretofore been described in connection with the indexing electrical control circuitry.

*Station A (advance ram—feed electrode)*

As the table 11 indexes into position, the dog 241 ratchets the cam assembly 205, and the limit switch 3LS, consisting of a normally open limit switch 3LS–1 on line E107, and a normally closed limit switch 3LS–2 on line E100, will be actuated. Therefore, as the limit switch 3LS–1 is closed, and since the contacts 4CR–3, 1CR–1, 34CR–2, and 7CR–2 are already closed, the relay coil 21CR will be energized. The limit switch 3LS–2 on line E100 opens to prevent the relay coil 13CRB from being energized.

As the coil 21CR is energized, latching contacts 21CR–1 and 21CR–2 on line E108 close to keep the coil 21CR energized; contacts 21CR–3 on line E110 close; and contacts 21CR–4 and 21CR–5 on line E134 close to energize the ram advance solenoid 4SOL, also shown in Figure 8.

As the solenoid 4SOL, station A, Figure 8, is energized, compressed air is ported into the upper chamber of the cylinder 50A, and the lower ram 48A moves forward into cutting position until stopped by a positive stopping means, shown in Figures 2 and 17, consisting of a dog 244 secured to the support member 12 in any conventional manner coming into contact with a bolt 245 threaded into the ram 48 and locked thereto by a lock nut 246.

As the ram 48A moves forward, the limit 5LS on line E111 and the limit switch 11LS on line E73 will be actuated by dogs 302A and 301A respectively as shown in Figure 8. The limit switch 5LS closes to permit the relay coil 23CR to be energized later, whereas the limit switch 11LS opens to deenergize the relay coil 11CR.

As the coil 11CR is deenergized, contacts 11CR–1 on line E82 open; contacts 11CR–2 on line E111 close and thus the relay coil 23CR is energized; and contacts 11CR–3 on line E8 open to prevent the electrode 61A from being shorted to the work piece 35 during the trepanning operation.

When the coil 23CR is energized, contacts 23CR–1 on line E112 close to maintain the coil 23CR energized, contacts 23CR–2 and 23CR–3 on line E138 close, thus energizing the solenoid 8SOL, also shown in Figure 8, to clamp the safety rod 83A at station A shown in Figure 6; and contacts 23CR–4 on line E3 close. Since contacts 7CR–3 and 4CRA–2 are also closed, the relay coil ($X_a$) on line E5 will be energized.

With reference to Figures 9 through 12, a plurality of power packs or sources of electrical energy, indicated generally by the reference numeral 247A, 247B, 247C, and 247D respectively, are provided to effect the machining operation at the respective stations A, B, C, and D. The sources of electrical energy 247 are identical, and each consists essentially of a pulsating D. C. power supply 248, a conventional adjustable output regulated reference-voltage power supply 249, and a conventional regulated D. C. power supply 250. Three phase power is supplied to input terminals 251, 252, and 253 of the power packs 247, whereas single phase power is supplied to the input terminals 254 and 255. The output of the D. C. power supply 249 is connected to output terminals 256 and 257, the output of the D. C. power supply 250 is connected to output terminals 258 and 259, and the output of the pulsating D. C. power supply 248 is connected to the output terminals 260 and 257. Electrical control circuitry to be later more fully described is connected to terminals 257, 261, 262, 263, and 264.

With reference to Figure 30 of the drawings, it will be evident that, in effect, the value of the output of the D. C. reference voltage power supply 249A at station A is algebraically compared with the average value of the pulsating output of the gap voltage power supply 248A which thus determines the direction and magnitude of the current flow through the armature 265A of the motor 54A; this will determine the speed and direction of rotation of the D. C. motor 54A because the D. C. voltage across the motor field 266A is held constant by the D. C. power supply 250A. The output shaft 55A of the motor 54A is directly coupled to the electrode structure 47A, and thus the electrode 61A as shown in Figures 1 and 2.

Therefore, when the coil ($X_a$) on line E5 is energized, contacts $X_a$–1 on line E6 will close to maintain the coil ($X_a$) energized, and contacts $X_a$–2, $X_a$–3, and $X_a$–4 on lines E2, E3, and E4 respectively will close and three phase power from the lines LL1, LL2, and LL3 will be supplied to the gap voltage power supply 248A. Contacts $X_a$–5 on line E8 will open to prevent the electrode 61A and work surface 35 from being short circuited during the trepanning operation. As the power supplies 249A and 250A are connected directly across the lines LL1 and LL2, they will be energized at the same instance that the said power lines are actuated. If the D. C. reference voltage as supplied by the power supply 249A is adjusted for some value, say 17 volts, which is lower than the actual open circuit gap voltage as supplied by the power supply 248A of, say 30 volts, the armature current through the motor 54A will be in such a direction and of such a value to cause the armature 265A to rotate in such a direction to rapid traverse the electrode 61A at station A toward the work surface 35.

As the electrode 61A is being traversed into cutting position, a dog actuated limit switch 9LS, shown in Figure 8, consisting of a normally open limit switch 9LS–1 on line E7 and a normally closed limit switch 9LS–2 on line E92 is released by its actuating dog 303A. Therefore, the limit switch 9LS–1 on line E7 will close so as to permit rapid retraction of the electrode 61A when the gap voltage power supply 248A is turned off as will later be seen, and the limit switch 9LS–2 on line E92 will open, thereby deenergizing the relay coil 34CR. When the coil 34CR is deenergized, contacts 34CR–1 on line E82 open to prevent the relay coil 1PR from being energized, and contacts 34CR–2 on line E107 opens but the relay coil 21CR remains energized.

When the electrode 61A is brought in close proximity with the work piece 35, thus forming a working gap distance, a series of electrical discharges will be fired across the gap which will produce a load on the gap voltage power supply 248A, thus lowering the gap voltage an amount dependent upon the gap current. As the gap distance is decreased, the average gap voltage will also decrease until it is equal to the preset value of the reference voltage as supplied by the power supply 249A. At this point, the current through the armature 265A will be zero, thus the motor 54A will cease rotation and will hold a constant prescribed cutting gap distance between the electrode 61A and the work piece 35 during the trepanning operation.

When the electrode 61A has cut through the wall of the workpiece 35, the electrode 61A will continue to feed forward to size the hole, thus cut, accurately and precisely. After the hole has been properly sized, a dog actuated limit switch 7LS on line E67, also shown in Figure 8, will be opened by a dog 304A, thereby deenergizing the relay coil 7CR.

As the coil 7CR is deenergized, contacts 7CR–1 on line E96 close, thereby energizing the relay coil 13CRB; contacts 7CR–2 on line E107 open, thereby deenergizing the relay coil 21CR; and contacts 7CR–3 on line E3 open, thereby deenergizing the relay coil ($X_a$) on line E5.

As the coil 13CRB on line E96 is energized, contacts 13CRA–1 on line E78 close to permit the relay coil 9CR to be energized later in order to initiate another index when so desired.

As the coil 21CR on line E107 is deenergized, contacts 21CR–1 and 21CR–2 on line E108 open, and contacts 21CR–3 on line E–110 open to prevent the relay coil 21CR from being energized; contacts 21CR–4 and 21CR–5 on line E134 open, thereby deenergizing the solenoid 4SOL, thus removing the air pressure from the upper chamber of the cylinder 50A and inserting the said air pressure into the lower chamber of the cylinder 50A so that the ram 48A and the electrode structure 47A will be retracted.

As the coil ($X_a$) is deenergized, contacts $X_a$–2, $X_a$–3, and $X_a$–4 on lines E2, E3, and E4 respectively open, thereby turning off the gap power supply 248A, and contacts $X_a$–5 on line E8 close to permit the electrode 61A and the workpiece 35 to be short circuited later.

When the ram 48A is fully retracted, the limit switch 11LS on line E73 will be closed by dog 301A, thereby energizing the relay coil 11CR. As the coil 11CR is energized, contacts 11CR–1 on line E82 close to permit the relay coil 1PR to be energized later; contacts 11CR–2 on line E111 open and deenergize the relay coil 23CR, and contacts 11CR–3 on line E8 close, and as the contacts $X_a$–5, 4CRB–3, and the limit switch 9LS–1 are also closed, the electrode 61A is short circuited to the workpiece 35. Now that the gap voltage is zero, and as the reference voltage is still 17 volts, the current through the armature 265A of the motor 54A will reverse and will be of such magnitude and in such a direction to cause the electrode 61A to be retracted at a rapid traverse rate.

As the coil 23CR is deenergized, contacts 23CR–1 on line E112 open to prevent the coil 23CR from being energized; contacts 23CR–2 and 23CR–3 on line E138 open and the solenoid 8SOL, also shown in Figure 8 is deenergized, thus unclamping the safety rod 83A shown in Figure 6, thus extending the permanent magnet 80A beyond the electrode cutting head 61A so that the islet will be accessible and be removed by hand, and contacts 23CR–4 on line E3 open to prevent the relay coil ($X_a$) from being energized.

As the ram 48A is retracted, the limit switch 7LS on line E67 will close, being released by dog 304A, and thus re-energize the relay coil 7CR which opens the contacts 7CR-1 on line E96 to deenergize the relay coil 13CRB; close contacts 7CR-2 on line E107 to permit the relay coil 21CR to be energized later; and close contacts 7CR-3 on line E3 so that the relay coil ($X_a$) may be energized later.

After the electrode 61A is fully retracted, the limit switch 9LS, also shown in Figure 8, consisting of limit switches 9LS-1 and 9LS-2 on lines E7 and E92 respectively will be actuated by dog 303A. As the limit switch 9LS-1 on line E7 is open, the short circuit is removed from across the discharge gap, thus stopping the motor 54A because now there is an open circuit and there is no path for the armature current to flow. As the limit switch 9LS-2 on line E92 is closed, the relay coil 34CR is energized.

As the coil 34CR is energized, contacts 34CR-1 on line E82 close to pemit the relay coil 1PR to be energized later; and contacts 34CR-2 on line E107 close to permit the relay coil 21CR to be energized later.

Now that all the contacts on line E82, consisting of 11CR-1, 12CR-1, 17CR-1, 33CR-1, 34CR-1, 35CR-1, 36CR-1, and 22CR-1 are closed, the green light 3LT-G on line E80 will be illuminated, indicating that all rams 48 and electrodes 47 at all work stations A, B, C, and D are back in position and the work table 11 is ready to be indexed into the second work position at point (b) as shown in Figure 27.

*Indexing cycle (b)*

Now that the first cycle of machining operation is completed, the "cycle start" pushbutton, PB-2 and PB-3, shown in Figure 20, is again manually actuated and the work table 11 will be indexed 45 degrees clockwise in the same sequence of operation as in the "indexing cycle (a)" which has heretofore been fully described. After the work table 11 has reached the second work position, the light 2LT-C, shown in Figure 20, will again be illuminated, thus indicating that the indexing is now complete.

*Stations A and B (advance rams—feed electrodes)*

Before the table 11 indexes into the second work position, the dog 241 on the table 11 again ratchets the cam box 205 shown in Figures 2 and 27, and thus the limit switches 4LS will be actuated as heretofore discussed. As the limit switch 3LS remains actuated, the ram 48A and electrode 61A at station A will again perform the same sequence of operation as has been heretofore described.

The limit switch 4LS, consisting of a normally open limit switch 4LS-1 on line E113 and a normally closed limit switch 4LS-2 on line E100, will be simultaneously actuated. Therefore, as the limit switch 4LS-1 is closed and as the contacts 35CR-2, 4CR-4, 1CR-2, and 8CR-2 are also closed, the relay coil 24CR will be energized thereby. The limit switch 4LS-2 on line E100 opens to prevent the relay coil 13CRB from being energized.

As the coil 24CR is energized, contacts 24CR-1 and 24CR-2 on line E114 closed to keep the coil 24CR energized after the index is complete, contacts 24CR-3 on line E116 close so that the coil 24CR may be energized during the manual operation as will later be seen, and contacts 24CR-4 and 24CR-5 on line E135 close and energize the ram advance solenoid 5SOL.

As the solenoid 5SOL is energized, compressed air is ported into the upper chamber of the cylinder 50B and thus the ram 48B moves forward into cutting position and is stopped by the positive stopping means as shown and described in Figure 17.

As the ram 48B moves forward, the dog actuated limit switch 6LS on line E117 and the dog actuated limit swtich 12LS on line E74, also shown in Figure 8, will be actuated by dogs 302B and 301B respectively. It is to be noted that dog 301 is not coplanar with dogs 300 and 302 for obvious reasons. The limit switch 6LS closes to permit the relay coil 25CR to be energized later, whereas the limit switch 12LS opens and the relay coil 12CR is deenergized thereby.

As the coil 12CR is deenergized, contacts 12CR-1 on line E82 open to prevent the relay coil 1PR from being energized; contacts 12CR-2 on line E117 close and thus the relay coil 25CR is energized; and contacts 12CR-3 on line E16 open to prevent the electrode 61B from being shorted to the workpiece 36 during the machining operation.

When the coil 25CR is energized, contacts 25CR-1 on line E118 close to maintain the coil 25CR energized; contacts 25CR-2 and 25CR-3 on line E139 close, thus energizing the solenoid 9SOL, also shown in Figure 8, which clamps the safety rod 83B at station B; and contacts 25CR-4 on line E12 close, and as the contacts 8CR-3 and 4CRA-3 are also closed, the power pack 247B at station B will be energized.

As the reference voltage between terminals 256B and 257B at station B is also set at 17 volts, the same as at station A, the said reference voltage will be lower than the actual open circuit gap voltage of 30 volts which is delivered by the power supply 248B to the electrode 61B and the work piece 36. Therefore, the armature current through the motor 54B will be in such a direction and of such a value to cause the armature 265B to rotate and rapid traverse the electrode 61B passing through the hole previously cut in the work piece 35 at station A toward the work surface 36 to effect the machining operation thereon.

As the electrode 61B is being traversed into cutting position, a dog actuated limit switch 10LS, shown in Figure 8, consisting of a normally open limit switch 10LS-1 on line E15 and a normally closed limit switch 10LS-2 on line E93 will be actuated by a dog 303B. Therefore, the limit switch 10LS-1 on line E15 will close so as to permit rapid retraction of the electrode 61B when the gap cutting voltage is removed, as will later be seen, and the limit switch 10LS-2 on line E93 will open, thereby deenergizing the relay coil 35CR. When the coil 35CR is deenergized, the contacts 35CR-1 on line E82 open to prevent the relay coil 1PR from being energized.

When the electrode 61B is brought in close proximity with the work piece 36, thus forming a working gap distance therebetween, a series of electrical discharges will be fired across the gap, as previously described in station A, and thus the electrode 61B will cut or trepan a hole in the second wall of the work piece 36.

When the electrode 61B has cut through the wall, it will continue to feed forward, thus sizing the hole accurately and precisely. After the hole has been properly sized, a dog actuated limit switch 8LS on line E68, will be opened by a dog 304B, thereby deenergizing the coil 8CR.

As the coil 8CR is deenergized, contacts 8CR-1 on line E97 close, thereby energizing the relay coil 13CRB; contacts 8CR-2 on line E113 open, thereby deenergizing the coil 24CR; and contacts 8CR-3 on line E12 open, thereby deenergizing the gap voltage power supply 248B, not shown. As the coil 13CRB on line E96 is energized, contacts 13CRA-1 on line E78 close to permit the relay coil 9CR to be energized later in order to initiate another index when so desired.

As the coil 24CR on line E113 is deenergized, contacts 24CR-1 and 24CR-2 on line E114 open to prevent the relay coil 24CR from being reenergized; contacts 24CR-3 on line E116 open to prevent also the coil 24CR from being reenergized; contacts 24CR-4 and 24CR-5 on line E-135 open, thereby deenergizing the solenoid 5SOL, thus removing the air pressure from the upper chamber of the cylinder 50B and inserting the said air pressure into the lower chamber of said cylinder 50B so that the ram 48B will be retracted at a rapid traverse.

When the ram 48B is fully retracted, the limit switch

12LS on line E74 will be closed by the dog 301B, thereby energizing the relay coil 12CR. As the coil 12CR is energized, contacts 12CR-1 on line E82 close to permit the relay coil 1PR to be energized later; contacts 12CR-2 on line E117 open and deenergize the relay coil 25CR; and contacts 12CR-3 on line E16 close which short circuits the electrode 61B to the work piece 36. Now that the gap voltage is zero, and as the reference voltage is still 17 volts, the current through the armature 265B of the motor 54B will reverse and will be of such magnitude and in such a direction to cause the electrode 61B to be retracted at a rapid traverse.

As the coil 25CR is deenergized, contacts 25CR-1 on line E118 open to prevent the coil 25CR from being energized; contacts 25CR-2 and 25CR-3 on line E139 open and the solenoid 9SOL, also shown in Figure 8, is deenergized, thus unclamping the safety rod 83B at station B which causes the permanent magnets 80B to extend beyond the electrode cutting head 61B so that the islet, formed after the hole had been cut, will be accessible and may be removed by hand; and contacts 25CR-4 on line E12 open to prevent the power supply 248B, not shown, from being energized.

Also, as the ram 48B is retracted, the limit switch 8LS on line E68 will be closed by a dog 304B and thus reenergize the relay coil 8CR which opens the contacts 8CR-1 on line E97 to deenergize the relay coil 13CRB; close contacts 8CR-2 on line E113 to permit the relay coil 24CR to be energized later; and close contacts 8CR-3 on line E12 so that the power supply 248B, not shown, may be energized later.

After the electrode 61B is fully retracted, the limit switch 10LS, consisting of limit switches 10LS-1 and 10LS-2 on lines E15 and E93 respectively will be actuated by dog 303B. As the limit switch 10LS-1 on line E15 is opened, the short circuit is removed from across the discharge gap, thus stopping the motor 54B because now there is no path for the armature current to flow. As the limit switch 10LS-2 on the line E93 is closed, the relay coil 35CR is energized. As the coil 35CR is energized, contacts 35CR-1 on line E82 close to permit the relay coil 1PR to be energized later.

Now that all the contacts on line E82 consisting of 11CR-1, 12CR-1, 17CR-1, 33CR-1, 34CR-1, 35CR-1, 36CR-1, and 22CR-1 are closed, the green light 3LT-G, also shown in Figure 19, will be illuminated, thus indicating that all rams 48 and electrodes 61 at all work stations A, B, C, and D are back into position and the work table 11 is ready to be indexed into the third work position at point (c) as shown in Figure 27.

*Indexing cycle (c)*

Now that the second cycle of machining operation is complete, the "cycle start" pushbutton PB-(2 and 3), shown in Figure 20, is again manually actuated and the work table 11 will again be indexed 45 degrees clockwise in the same sequence of operation as in the "indexing cycle (a)," which has heretofore been fully described. After the worktable 11 has reached the third work position, the light 2LT-C, shown in Figure 20, will again be illuminated, thus indicating that the indexing is now complete.

*Stations A, B, and C (advance rams—feed electrodes)*

Before the table 11 indexes into position, the dog 241 on the table 11 again ratchets the cam box 205, shown in Figures 2 and 27, and thus the limit switch 13LS will be actuated. As the limit switches 3LS and 4LS remain actuated, the rams 48A and 48B and electrodes 61A and 61B at stations A and B respectively will simultaneously perform the same sequence of operation as has been heretofore described.

The limit switch 13LS, consisting of a normally open switch 13LS-1 on line E119 and a normally closed switch 13LS-2 on line E100, will be simultaneously actuated. Therefore, as the switch 13LS-1 is closed and as the contacts 36CR-2, 4CR-5, 1CR-3, and 15CR-2 are also closed, the relay coil 26CR will be energized. The switch 13LS-2 on line E100 opens to prevent the relay coil 13CRB from being energized.

As the coil 26CR is energized, contacts 26CR-1 and 26CR-2 on line E120 close to keep the coil 26CR energized after the index is complete; contacts 26CR-3 on line E122 close so that the coil 26CR may be energized during the manual operation; contacts 26CR-4 and 26CR-5 on line E136 close and energize the ram advance solenoid 6SOL, also shown in Figure 8.

As the solenoid 6SOL is energized, compressed air is ported into the upper chamber of the cylinder 50C and thus the ram 48C moves forward into cutting position, and it is stopped by the positive stopping means as shown and described in relation to Figure 17.

As the ram 48C moves forward, the dog actuated limit switch 14LS on line E123 and the dog actuated limit switch 17LS on line E75, also shown in Figure 8, will be actuated by dogs 302C and 301C respectively. The limit switch 14LS closes to permit the relay coil 27CR to be energized later, whereas the limit switch 17LS opens and the relay coil 17CR is deenergized thereby.

As the coil 17CR is deenergized, contacts 17CR-1 on line E82 open to prevent the relay coil 1PR from being energized; contacts 17CR-2 on line E123 close and thus the relay coil 27CR is energized; and contacts 17CR-3 on line E26 open to prevent the electrode 61C from being shorted to the work piece 37.

When the coil 27CR is energized, contact 27CR-1 on line E124 closes to maintain the coil 27CR energized; contacts 27CR-2 and 27CR-3 on line E140 close, thus energizing the solenoid 10SOL and causes the safety rod 83C at station C to be clamped and contacts 27CR-4 on line E22 close, and since the contacts 15CR-3 and 4CRA-4 are also closed, the power supply 248C at station C, not shown, will be energized.

As the reference voltage between terminals 256C and 257C at station C is also adjusted at 17 volts, the same as at stations A and B, the said reference voltage will be lower than the actual open circuit gap voltage of 30 volts, which is supplied by the power supply 248C, not shown, to the electrode 61C and the work piece 37. Therefore, the armature current through the motor 54C will be in such a direction and of such a value to cause the armature 265C to rotate and rapid traverse the electrode 61C, passing through the in-line holes previously cut in the work pieces 35 and 36 at stations A and B respectively, toward the work surfaces 37 to effect the machining operation thereon.

As the electrode 61C is being traversed into cutting position, a dog actuable limit switch 16LS, shown in Figure 8, consisting of a normally open limit switch 16LS-1 on line E25 and a normally closed limit switch 16LS-2 on line E94 will be actuated by dog 303C. Therefore, the limit switch 16LS-1 on line E25 will close so as to permit rapid retraction of the electrode 61C when the gap cutting voltage is removed as will later be seen, and the limit switch 16LS-2 on line E94 will open, thereby deenergizing the relay coil 36CR. When the coil 36CR is deenergized, the contacts 36CR-1 on line E82 open to prevent the relay coil 1PR from being energized.

When the electrode 61C is brought in close proximity with the work piece 37, thus forming a working gap distance, a series of electrical discharges will be fired across the gap as previously described at station A, and thus the electrode 61C will cut or trepan a hole in the work piece 37.

When the electrode 61C has cut through the wall of the work piece 37, the said electrode 61B will continue to feed forward, thus sizing the hole accurately and precisely. After the hole has been properly sized, a dog actuable limit switch 15LS on line E69, also shown in Figure 8, will be open by a dog 304C, thereby deenergizing the coil 15CR.

As the coil 15CR is deenergized, contacts 15CR–1 on line E98 close, thereby energizing the relay coil 13CRB; contacts 15CR–2 on line E119 open, thereby deenergizing the coil 26CR; and contacts 15CR–3 on line E22 open, thereby deenergizing the gap voltage power supply 248C, not shown. As the coil 13CRB on line E96 is energized, contacts 13CRA–1 on line E78 close to permit the relay coil 9CR to be energized.

As the coil 26CR on line E119 is deenergized, contacts 26CR–1 and 26CR–2 on line E120 open to prevent the relay coil 26CR from being reenergized; contacts 26CR–3 on line E122 open to also prevent the coil 26CR from being reenergized; contacts 26CR–4 and 26CR–5 on line E–136 open, thereby deenergizing the solenoid 6SOL, also shown in Figure 8, thus removing the air pressure from the upper chamber of the cylinder 50C and inserting the said air pressure into the lower chamber of the cylinder 50C and thus the ram 48C will be retracted at a rapid traverse.

When the ram 48C is fully retracted, the limit switch 17LS on line E75 will be closed by dog 301C, thereby energizing the relay coil 17CR. As the coil 17CR is energized, contacts 17CR–1 on line E82 close to permit the relay coil 1PR to be energized; contacts 17CR–2 on line E123 open and deenergize the relay coil 27CR; and contact 17CR–3 on line E26 close, which short-circuits the electrode 61C to the work piece 37.

Now that the gap voltage is zero and as the reference voltage is still 17 volts, the current through the armature 265C of the motor 54C will be of such magnitude and in such a direction so as to cause the electrode 61C to be retracted at a rapid traverse.

As the coil 27CR is deenergized, contacts 27CR–1 on line E124 open to prevent the coil 27CR from being energized; contacts 27CR–2 and 27CR–3 on line E140 open and the solenoid 10SOL, also shown in Figure 8, is deenergized, thus unclamping the safety rod 83C at station C and causing the permanent magnets 80C to extend beyond the electrode cutting head 61C so that the islet, formed after the hole had been cut, will be accessible and may be removed by hand; and contacts 27CR–4 on line E22 open to prevent the power supply 248B from being energized.

Also, as the ram 48C is retracted, the limit switch 15LS on line E69 will be closed by dog 304C and thus reenergize the relay coil 15CR which opens the contacts 15CR–1 on line E98 to deenergize the relay coil 13CRB; close contacts 15CR–2 on line E119 to permit the relay coil 26CR to be energized later; and close contacts 15CR–3 on line E22 so that the power supply 248C, not shown, may be energized again when so desired.

After the electrode 61C is fully retracted, the limit switch 16LS, also shown in Figure 8, consisting of limit switches 16LS–1 and 16LS–2 on lines E25 and E94 respectively will be actuated by dog 303C. As the limit switch 16LS–1 on line E25 is opened, the short circuit is removed from across the discharge gap, thus stopping the motor 54C because now there is no path for the armature current to flow. As the limit switch 16LS–2 on line E94 is closed, the relay coil 36CR is energized. As the coil 36CR is energized, contacts 36CR–1 on line E82 close to permit the relay coil 1PR to be energized.

Now that all the contacts on line E82, consisting of 11CR–1, 12CR–1, 17CR–1, 33CR–1, 34CR–1, 35CR–1, 36CR–1, and 22CR–1, are closed, the green light 3LT–G, also shown in Figure 19, will again be illuminated, thus indicating that all rams 48 and electrodes 61 are back into position and the work table 11 is ready to be indexed into the fourth position (d).

*Indexing cycle (d)*

Now that the third cycle of machining operation is complete, the "Cycle start" push button PB2 and 3, shown in Figure 20 is again actuated and the work table 11 will again be indexed 45 degrees clockwise in the same sequence of operation as in the "Indexing cycle (a)" which has heretofore been fully described. After the work table 11 has reached the fourth work position, the light 2LT–C, shown in Figure 20, will again be illuminated, thus indicating that the indexing is now complete.

*Stations A, B, C, and D (advance rams—feed electrodes)*

Before the table 11 indexes into position, the dog 241 on the table 11 again ratchets the cam box 205 shown in Figures 2 and 27, and thus the limit switch 18LS will be actuated. As the limit switches 3LS, 4LS, and 13LS remain actuated, the rams 48A, 48B, and 48C and electrodes 61A, 61B, and 61C, at stations A, B, and C respectively, will simultaneously perform the same sequence of operation as has been heretofore described. The limit switch 18LS consisting of a normally open switch 18LS–1 on line E125, and a normally closed limit switch 18LS–2 on line E100, will be simultaneously actuated. Therefore, as the limit switch 18LS1 is closed and as the contacts 33CR–2, 4CR–6, 1CR–4, and 20CR–2 are also closed, the relay coil 28CR will be energized thereby. The limit switch 18LS–2 on line E100 opens to prevent the relay coil 13CRB from being energized.

As the coil 28CR is energized, contacts 28CR–1 and 28CR–2 on line E126 close to keep the coil 28CR energized after the index is complete; contacts 28CR–3 on line E128 close so that the coil 28CR may be energized when so desired. Contacts 28CR–4 and 28CR–5 on line E137 close and energize the ram advance solenoid 7SOL also shown in Figure 8.

As the solenoid 7SOL is energized, compressed air is ported into the upper chamber 50D and thus the ram 48D at station D is rapid traversed forward into cutting position and is stopped by the positive stopping means as shown and described in relation to Figure 17.

As the ram 48D moves forward, the dog actuated limit switch 19LS on line E129 and the dog actuated limit switch 22LS on line E76, also shown in Figure 8, will be actuated by dogs 302D and 301D respectively. The limit switch 19LS closes to permit the relay coil 29CR to be energized later, whereas the limit switch 22LS opens and the relay coil 22CR is deenergized thereby.

As the coil 22CR is deenergized, contacts 22CR–1 on line E82 open to prevent the relay coil 1PR from being energized, contacts 22CR–2 on line E129 close, and thus the relay coil 29CR is energized; and contacts 22CR–3 on line E34 open to prevent the electrode 61D from being shorted to the work piece 38.

When the coil 29CR is energized, contacts 29CR–1 on line E130 close to maintain the coil 29CR energized; contacts 29CR–2 and 29CR–3 on line E141 close, thus energizing the solenoid 11SOL, also shown in Figure 8, which causes the safety rod 83D at station D to be clamped; and contacts 29CR–4 on line E30 close, and as the contacts 20CR–3 and 4CRA–5 are also closed the power supply 248D at station D, not shown, will be energized.

As the reference voltage between terminals 256D and 257D at station D is also adjusted to 17 volts the same as at stations A, B, and C, the said reference voltage will again be lower than the actual open circuit gap voltage of 30 volts, which is supplied by the power supply 248D, not shown, to the electrode 61D and the work piece 38. Therefore, the armature current through the motor 54D will be in such a direction and of such a value to cause the armature 265D to rotate and rapid traverse the electrode 61D, passing through the in-line holes previously cut in the work pieces 35, 36, and 37 at stations A, B, and C respectively toward the work surface 38 to effect the machining operation thereon.

As the electrode 61D is being traversed into cutting position, a dog actuable limit switch 21LS shown in Figure 8, consisting of a normally open limit switch 21LS–1 on line E33 and a normally closed limit switch 21LS–2 on line E77 will be actuated by a dog 303D. Therefore, the limit switch 21LS-1 on line E33 will close so as to permit rapid retraction of the electrode 61D when the gap cutting voltage is removed, and the limit switch 21LS-2 on line E77 will open, thereby deenergizing the relay coil 33CR. When the coil 33CR is deenergized, the contacts 33CR-1 on line E82 open to prevent the relay coil 1PR from being energized.

When the electrode 61D is brought in close proximity with the work piece 38, thus forming a working gap distance, a series of electrical discharges will be fired across the gap, as previously described at station A, and thus the electrode 61D will cut or trepan a hole in the workpiece 38.

When the electrode 61D has cut through the wall of the work piece 38, the said electrode 61D will continue to feed forward, thus sizing the hole accurately and precisely. After the hole has been properly sized, a dog actuable limit switch 20LS on line E70, also shown in Figure 8, will be opened by a dog 304D, thereby deenergizing the coil 20CR.

As the coil 20CR is deenergized, contacts 20CR-1 on line E99 close, thereby energizing the relay coil 13CRB; contacts 20CR-2 on line E125 open, thereby deenergizing the coil 28CR; and contacts 20CR-3 on line E30 open, thereby deenergizing the gap voltage power supply 248D, not shown. As the coil 13CRB on line E96 is energized, contacts 13CRA-1 on line E78 close to permit the relay coil 9CR to be energized in order to initiate another index when so desired. As the coil 28CR on line E125 is deenergized, contacts 28CR-1 and 28CR-2 on line E126 open to prevent the relay coil 28CR from being reenergized; contacts 28CR-3 on line E128 open to also prevent the coil 28CR from being reenergized; contacts 28CR-4 and 28CR-5 on line E137 open, thereby deenergizing the solenoid 7SOL, also shown in Figure 8, thus removing the air pressure from the upper chamber of the cylinder 50D and inserting the said air pressure into the lower chamber of the cylinder 50B and thus the ram 48D will be retracted at a rapid traverse.

When the ram 48D is full retracted, the limit switch 22LS on line E76 will be closed by dog 301D, thereby energizing the relay coil 22CR. As the coil 22CR is energized, contacts 22CR-1 on line E82 close to permit the relay coil 1PR to be energized later; contacts 22CR-2 on line E129 open and deenergize the relay coil 29CR; and the contacts 22CR-3 on line E34 close and short-circuit the electrode 61D to the work piece 38.

Now that the gap voltage is zero and as the reference voltage is still 17 volts the current through the armature 265D of the motor 54D will reverse and will be of such magnitude and in such a direction so as to cause the electrode 61D to be retracted at a rapid traverse. As the coil 29CR is deenergized, contacts 29CR-1 on line E130 open to prevent the relay coil 29CR from being energized; contacts 29CR-2 and 29CR-3 on line E141 open and the solenoid 11SOL, also shown in Figure 8, is deenergized, thus unclamping the safety rod 83D at station D, causing the permanent magnets 80D to extend beyond the electrode cutting head 61D so that the islet formed after the hole had been cut will be accessible and may be removed by hand; and contacts 29CR-4 on line E30 open to prevent the power supply 248D, not shown, from being energized.

Also, as the ram 48D at station D is retracted, the limit switch 20LS on line E70 will be closed by dog 304D and thus reenergize the relay coil 20CR which opens the contacts 20CR-1 on line E99 to deenergize the relay coil 13CRB; close contacts 20CR-2 on line E125 to permit the relay coil 28CR to be energized; and close contacts 20CR-3 on line E30 so that the power supply 248D, not shown, may be energized.

After the electrode 61D is fully retracted, the limit switch 21LS also shown in Figure 8, consisting of limit switches 21LS-1 and 21LS-2 on lines E33 and E77 respectively, will be actuated by dog 303D. As the limit switch 21LS-1 on line E33 is open, the short circuit is removed from across the discharge gap, thus stopping the motor 54D because now there is no path for the armature current to flow, as the limit switch 21LS-2 on line E77 is closed and the relay coil 33CR is energized. As the coil 33CR is energized, contacts 33CR-1 on line E82 close to permit the relay coil 1PR to be energized later.

Now that all the contacts on line E82 are closed, consisting of 11CR-1, 12CR-1, 17CR-1, 33CR-1, 34CR-1, 35CR-1, 36CR-1, and 22CR-1, the green light 3LT-G, also shown in Figure 19, will be illuminated, thus indicating that all rams 48 and electrodes 61 at all stations A, B, C, and D are back into position and the work table 11 is ready to be indexed into the fifth position (e).

Therefore, it is now evident, with reference to Figure 27 of the drawings, that as the table indexes from (d) to (h) are initiated, the stations A, B, C, and D will simultaneously repeat the same sequence of operation as heretofore described. As index (i) is initiated, station A will be inactive while stations B, C, and D will simultaneously repeat the same sequence of operation as heretofore described. As index (j) is initiated, stations A and B will be inactive, whereas stations C and D will simultaneously repeat the same sequence of operation as heretofore described. As index (k) is initiated, stations A, B, and C will be inactive whereas station D will repeat the same sequence of operation as heretofore described. As indexes (l) through (p) is initiated, all stations will remain inactive and the table 11 may be therefore indexed electrically to its original starting position.

Full automatic cycle control

The cycle control heretofore described, may be called in a sense, "semi-automatic" because the "cycle start" pushbutton PB-3 on line E78 must be manually actuated after each cycle of operation is completed in order to initiate the next cycle of operation. Therefore, if the "full automatic" switch SW-5 on line E79, also shown in Figure 20, is closed, the relay coil 38CR on line E79 will be energized after all rams 48 and electrodes 61 at stations A, B, C, and D have returned after their respective machining operation has been completed because the contacts 11CR-1, 12CR-1, 17CR-1, 33CR-1, 34CR-1, 35CR-1, 36CR-1, and 22CR-1 will then be closed. As the coil 38CR is energized, contacts 38CR-1 on line E79 will close and thus the relay coil 9CR on line E78 will be energized and the table 11 will automatically index to the next work position without having to manually actuate the "cycle start" pushbutton PB-3 on line E78 after each cycle of operation has been completed. The switch SW-5 on line E79 is then opened at any desired time by proper placement of a dog 395, shown in Figure 8, on the work table 11.

Manual operation

Now that the aforementioned automatic sequence of machining operation of stations A, B, C, and D has heretofore been fully described, it can also be readily seen with reference to the electrical control circuitry, as shown in Figures 9 to 16, that the said automatic sequence of operation may be also performed in a manual step-by-step sequence of operation described in general terms as follows:

If the "set-up" switch SW-3 on line E71 is closed, the relay coils 32CRA and 32CRB will be energized, and thus the work table 11 may be indexed 45 degrees clockwise each time the "table index" pushbutton PB-5 on line E81 is actuated.

If the "cycle selector" switch SW-2 on line E61 is set to "manual operation" the automatic relay coils 4CR will be deenergized, and thus when the cycle start pushbutton PB-2 on line E60 is actuated, all the manual relay coils 5CR will be energized to perform essentially the same function as the said automatic relay coils 4CR but in a manual sequence of operation rather than an automatic sequence of operation.

After the first index has been initiated, the limit switch 3LS-1 on line E107 will be closed so that the ram 48A at station A may be advanced by actuating the advance ram pushbutton PB-8A on line E109 and may be retracted by actuating the retract ram pushbutton PB-9A also on line E109. The electrode 61A at station A may be advanced by actuating the feed electrode pushbutton PB-10A on line E110 and may be thereafter retracted by actuating the retract electrode pushbutton PB-11A on line E7.

After the second index has been initiated, the limit switch 4LS-1 on line E113 will close and the ram 48B at station B may be advanced by actuating the ram advance pushbutton PB-8B on line E115, and may be thereafter retracted by actuating the retract ram pushbutton PB-9B also on line E115. The electrode 61B at station B may be advanced by actuating the feed electrode pushbutton PB-10B on line E116 and may be retracted by actuating the retract electrode pushbutton PB-11B on line E14.

After the third index has been initiated the limit switch 13LS-1 on line E119 will be closed, and thus the ram 48C at station C may be advanced by actuating the advance ram pushbutton PB-8C on line E122 and may be retracted by actuating the retract ram pushbutton PB-9C, also on line E121. The electrode 61C at station C may be advanced by actuating the feed electrode pushbutton PB-10C on line E122 and may be retracted by actuating the retract electrode pushbutton PB-11C on line E24.

After the fourth index has been initiated the limit switch 18LS-1 on line E125 will be closed and thus the ram 48D at station D may be advanced by actuating the advance ram pushbutton PB-8D on line E127 and may be retracted by actuating the retract ram pushbutton PB-9D also on line E127. The electrode 61-D at station D may be advanced by actuating the feed electrode pushbutton PB-10D on line E128 and may be retracted by actuating the retract electrode pushbutton PB-11D on line E33.

Therefore, it can be seen that the sequence of operations of the stations A, B, C, and D may be controlled, either simultaneously or consecutively, as so desired, by using either the semi-automatic, the full automatic, or the manual cycle of operation, thus making the machine more adaptable to the point of versatility to meet various manufacturing needs.

*Drain the work tank*

As the cycle stop pushbutton PB-6 on line E60, also shown in Figure 20, is actuated, the automatic relay coils 4CR and the manual relay coils 5CR will be deenergized so that as the tank drain pushbutton PB-4 on line E57 is actuated, the relay coil 3CR on line E55 will be energized.

As the coil 3CR is energized, contacts 3CR-1 on line E53 open to deenergize the tank fill relay coil 2CR; contacts 3CR-2 on line E58 close to maintain the relay coil 3CR energized; and contacts 3CR-3 and 3CR-4 on line E132 close and energize the solenoid 2SOL.

As the solenoid 2SOL, also shown in Figure 8, is energized, the compressed air will be released from the reservoir 16 and thus the dielectric coolant 27 will drain by gravity from the work tank 26 back into the said reservoir 16. After the coolant 27 has returned to the reservoir 16, the float switch FS2 will be actuated on line E54 and will energize the relay coil 30CR which opens contacts 30CR-2 on line E58 which, in turn, deenergizes the relay coil 3CR on line E55.

As the coil 3CR is deenergized, contacts 3CR-3 and 3CR-4 on line E132 open to deenergize the solenoid 2SOL making the machine ready for the next operation when the compressed air will be ported to the reservoir 16.

As the coil 2CR on line E53 is deenergized, contacts 2CR-2 on line E59 will open, thereby deenergizing the feed lines L18 and L21.

*Electrode wear compensation*

It has been found that as a result of the machining operation the electrode head 61 experiences considerable wear depending upon the type of material being machined.

Therefore, with reference to Figure 25 of the drawings, means have been provided to compensate this effect of electrode wear which tends to decrease the length of the electrode cutting head 61. Said means consists essentially of a housing member 265 integrally connected to the upper slide 47 and containing a bore 266 formed therein which is connected with a perpendicular bore 267 formed in the upper slide 47. A rack 268 is slidably mounted in the bore 267 and is integrally connected to the plate 73 of the electrode structure 60 as shown in Figure 6 of the drawings.

The rack 268 is engaged with and driven by a worm 269, which, in turn, is engaged with and driven by a bevel gear 270, all of which is mounted in the bore 266.

A second housing member 270' is pressed into the bore 266 and secured thereto by any suitable means. The bevel gear 270 is connected to the shaft 271 which is rotatably mounted in a bore 272 formed in the member 270'. The bevel gear 270 is held in engagement with the gear 269 by action of a bushing 273 pressed into the bore 272 against a shoulder 274 formed on a shaft 271. The bushing 273 is held in position by action of a lock screw 275 threaded in the member 270'. A head 276 is secured to the member 270' in any suitable means such that the shaft 271 will be extended through a bore 277 formed in the head 276. Rotation of the shaft 271 may be prevented by action of a lock screw 278 threaded in the head 276 contacting the said shaft 271. A control knob 279 is connected to the shaft 271 in such a manner that rotational movement of the knob 279 will effect linear movement of the rack 286, thus movement of the electrode structure 60. Therefore, it may now be seen that the initial adjustment of the distance between the electrode cutting head and the workpiece may be made by proper adjustment of the knob 279 which then may be locked into position by the lock screw 278.

While the invention has been described with considerable detail, it is not to be limited to the particular construction shown, and it is the intention to cover hereby all adaptations, modifications, and uses thereof which come within the practice of those skilled in the art to which it relates and within the scope of the appended claims.

What is claimed is:

1. In a machine for trepanning holes or slots in a work surface by electrical discharges, the combination of a base, a work table mounted on said base, a tool support mounted on said base adjacent to said work table, a tool carriage slidably mounted on said tool support for movement to and from said work table, said tool carriage comprising a lower slide supporting an upper slide, a tool electrode carried by said upper slide, power operable rapid traversing means to advance and retract said lower slide, means to energize said traversing means, positive stopping means to define the limits of said advancement and retraction, power operable feeding means to advance and retract said upper slide and electrode, means trip operable by said advancing lower slide to energize said feeding means and said electrode to effect the trepanning operation by electrical discharges, means trip operable by said advancing upper slide to reverse said traversing means to retract said slides and electrode after completion of the trepanning operation, and means trip operable by said retracting lower slide to reverse said feeding means to retract said upper slide, and means trip operable by retraction of said upper slide to deenergize said feeding means.

2. In a machine for trepanning holes or slots in a work surface by electrical discharges, the combination of a base, a work table mounted on said base, a tool support mounted on said base adjacent to said work table, a tool carriage slidably mounted on said tool support for movement to and from said work table, said tool carriage comprising a lower slide supporting an upper slide, a tool electrode carried by said upper slide, fluid operable rapid traversing means to advance and retract said lower slide, positive stopping means to define the limits of said advancement and retraction, a source of fluid pressure, means for connecting said pressure source to said traversing means to move and to hold said lower slide against said positive stopping means, power operable feeding means to advance and retract said upper slide and electrode, means trip operable by said advancing lower slide to energize said feeding means and said electrode to advance said upper slide and cause the electrode to effect the trepanning operation by electrical discharges, means trip operable by said advancing upper slide to reverse said traversing means to retract said slides and electrode after completion of the trepanning operation, and means trip operable by said retracting lower slide to reverse said feeding means to retract said upper slide and deenergize said electrode, and means trip operable by said retracting upper slide to deenergize said feeding means.

3. In a machine for trepanning holes or slots in a work surface by electrical discharges, the combination of a base, a work table mounted on said base, a tool support mounted on said base adjacent to said work table, a tool carriage slidably mounted on said tool support for movement to and from said work table, said tool carriage comprising a lower slide supporting an upper slide, a tool electrode carried by said upper slide, power operable rapid traversing means to advance and retract said lower slide, means to energize said traversing means, positive stopping means to define the limits of said advancement and retraction, a reversible electric motor to advance and retract said upper slide and electrode, means trip operable by said advancing lower slide to energize said electric motor to establish a discharge gap between said electrode and work to effect the trepanning operation, electric means responsive to the magnitude of said discharge gap to control reversible rotation of said motor to maintain a constant discharge gap during the trepanning operation, means trip operable by said advancing upper slide to reverse said traversing means to retract said slides and electrode after completion of said trepanning operation, means trip operable by said retracting lower slide to reverse said motor to retract said upper slide and electrode, and means trip operable by said retracting upper slide to deenergize said motor.

4. In a machine for trepanning holes or slots in a work surface by electrical discharges, the combination of a base, a work table mounted on said base, a tool support mounted on said base adjacent to said work table, a tool carriage slidably mounted on said tool support for movement to and from said work table, said tool carriage comprising a lower slide supporting an upper slide, a tool electrode carried by said upper slide, fluid operable rapid traversing means to advance and retract said lower slide, positive stopping means to define the limits of said advancement and retraction, a source of fluid pressure, means for connecting said fluid pressure to said traversing means to move and to hold said lower slide against said positive stopping means, a reversible electric motor to advance and retract said upper slide and electrode, means trip operable by said advancing lower slide to energize said electric motor to establish a discharge gap between said electrode and work to effect the trepanning operation, electric means responsive to the magnitude of said discharge gap to control reversible rotation of said motor to maintain a constant discharge gap during the trepanning operation, means trip operable by said upper advancing slide to reverse said traversing means to retract said slides and electrode after completion of said trepanning operation, means trip operable by said retracting lower slide to reverse said motor to retract said upper slide and electrode, and means trip operable by said retracting upper slide to deenergize said motor.

5. In a machine for trepanning a series of angularly spaced holes or slots about the circumference of a work surface by electrical discharges, the combination of a base, an indexible work table mounted on the base and having an axis of rotation, electric operable means including a starting switch for indexing said work table, a tool carriage slidably mounted on said tool support for movement to and from said work table, said tool carriage comprising a lower slide supporting an upper slide, a tool electrode carried by said upper slide, power operable rapid traversing means to advance and retract said lower slide, means trip operable by said indexible work table to energize said traversing means to start advancement of said lower slide, positive stopping means to limit said advancement, power operable feeding means to advance and retract said upper slide and electrode to and from said axis of rotation, means trip operable by said advancing lower slide to energize said feeding means and said electrode to advance said upper slide and cause said energized electrode to effect the trepanning operation, means trip operable by said advancing upper slide to reverse said traversing means to retract said slides and electrode upon completion of the trepanning operation, means trip operable by said retracting lower slide to reverse said feeding means to retract said upper slide, and means trip operable by said retracting upper slide to deenergize said feeding means.

6. In a machine for trepanning a series of angularly spaced holes or slots about the circumference of a work surface by electrical discharges, the combination of a base, an indexible work table mounted on the base and having an axis of rotation, electrically operable means for indexing said work table, a tool carriage slidably mounted on said tool support for movement to and from said work table, said tool carriage comprising a lower slide supporting an upper slide, a tool electrode carried by said upper slide, power operable rapid traversing means having a starting means to advance and retract said lower slide, positive stopping means to define the limits of said advancement and retraction, power operable feeding means to advance and retract said upper slide and electrode toward and from said axis of rotation, means trip operable by said advancing lower slide to energize said feeding means and said electrode to advance said upper slide and cause said energized electrode to effect the trepanning operation, means trip operable by said advancing upper slide to reverse said traversing means to retract said slides and electrode upon completion of the trepanning operation, means trip operable by said retracting lower slide to reverse said feeding means to retract said upper slide, a power circuit including series connected trip operable switch means respectively actuated upon retraction of said lower and upper slides to energize said indexing means, and means trip operable by said indexible work table to deenergize said indexing means.

7. In a machine for trepanning a series of angularly spaced holes or slots about the circumference of a work surface by electrical discharges, the combination of a base, an indexible work table mounted on the base and having an axis of rotation, electrically operable means for indexing said work table, a tool support mounted on said base adjacent to said work table, a tool carriage slidably mounted on said tool support for movement to and from said work table, said tool carriage comprising a lower slide supporting an upper slide, a tool electrode carried by said upper slide, power operable rapid traversing means to advance and retract said lower slide, means trip operable by said indexible work table to energize said traversing means to start advancement of said lower slide, positive stopping means to limit said advancement, power operable feeding means to advance and retract said upper slide and electrode to and from said axis of rotation, means trip operable by said advancing lower slide to energize said feeding means and said electrode to advance said upper slide and cause said energized electrode to effect a trepanning operation, means trip operable by said advancing upper slide to reverse said traversing means to retract said slides and electrode upon completion of the trepanning operation, means trip operable by said retracting lower slide to reverse said feeding means to retract said upper slide to complete a cycle of operation, a power circuit including series connected trip operable switches respectively actuated by the retracted lower and upper slides to operatively energize said indexing means to initiate the next cycle of operation, a latch switch connected between said trip switches, manually closed to start the initial cycle of operation, and means trip operable by said indexible work table to open said latch switch to stop the cycle of operation.

8. In a machine for trepanning holes or slots in a work surface by electrical discharges, the combination of a base, a work table mounted on said base, a tool support mounted on said base adjacent to said work table, a tool carriage slidably mounted on said tool support for movement to and from said work table, said tool carriage comprising a lower slide supporting an upper slide, a hollow tool electrode having a cutting face carried by said upper slide, power operable rapid traversing means having starting means to advance and retract said lower slide, positive stopping means to define the limits of said advancement and retraction, power operable feeding means to advance and retract said upper slide and electrode, means trip operable by said advancing lower slide to energize said feeding means and said electrode to advance said upper slide and cause said energized electrode to effect the trepanning operation, a guide rod slidably mounted in said upper slide extending beyond said electrode face, magnetic means carried by said rod to cohere to the potential islet to be formed by the trepanning operation, means trip operable by said advancing upper slide to lock said guide rod to said lower slide, and to reverse said traversing means to retract said slides, rod and islet upon completion of said trepanning operation, means trip operable by said retracting lower slide to reverse said feeding means to retract said upper slide and unlock said guide rod, and means trip operable by said retracting upper slide to deenergize said feeding means.

9. In a machine for trepanning holes or slots in an undulatory or the like work surface by electrical discharges, the combination of a base, a work table mounted on said base, a tool support mounted on said base adjacent to said work table, a tool carriage slidably mounted on said tool support for movement to and from said work table, said tool carriage comprising a lower slide supporting an upper slide, a hollow tool electrode having a complementary symmetrical cutting face with respect to the surface contour of the work to be trepanned carried by said upper slide, power operable rapid traversing means having starting means to advance and retract said lower slide, positive stopping means to define the limits of said advancement and retraction, power operable feeding means to advance and retract said upper slide and electrode, means trip operable by said advancing lower slide to energize said feeding means and said electrode to advance said upper slide and cause said energized electrode to effect the trepanning operation, a guide rod slidably mounted in said upper slide and extending through and beyond said electrode cutting face, magnetic means carried by said rod to cohere to and having a complementary symmetrical face with respect to the surface contour of the potential islet to be formed by the trepanning operation, means trip operable by said advancing upper slide to lock said guide rod to said lower slide and to reverse said traversing means to retract said slides, rod and islet upon completion of said trepanning operation, and means trip operable by said retracting lower slide to reverse said feeding means to retract said upper slide and unlock said guide rod, and means trip operable by said retracting upper slide to deenergize said feeding means.

10. In a machine for simultaneously trepanning a plurality of angularly spaced holes or slots in an undulatory or the like work surface by electrical discharges, the combination of a base, a work table mounted on said base, a plurality of work stations, each comprising a tool support mounted on the said base for circumferential adjustment about said work table to preset the position of said tool supports relative to one another, a tool electrode having a complementary symmetrical cutting face with respect to the surface contour of the work to be trepanned operatively slidable on each tool support for movement to and from said work table, power operable traversing means for moving said electrode toward and from the work carried by said work table to perform a trepanning operation thereon, electrical control means having a starting switch for simultaneously energizing each of said traversing means at the respective work stations each time said switch is closed, and means trip operable by said electrodes to open said starting switch at the end of the trepanning operation.

11. In a machine for trepanning successive in line holes or slots in successive concentric, non-parallel and/or undulatory or the like work walls, the combination of a base, an indexible work table mounted on said base having an axis of rotation, a plurality of work stations, the number of which equals the number of said work walls to be penetrated, each work station comprising a tool support mounted on said base in circumferential spaced relation about said work table, a tool electrode having a complementary symmetrical cutting face with respect to the surface contour of the work wall to be trepanned operatively slidable on each tool support for movement to and from said axis of rotation, individual power operable traversing means operatively connected to the respective electrodes for moving them through successive precut holes in successive walls toward and from its respective work wall to perform a trepanning cycle of operation thereon, electrically operable indexing means having a starting switch for indexing said work table from station to station, a station selector means trip operable by said indexible work table for sequential energization of said power operable traversing means and electrode at said selected station, and means trip operable by said electrode at said selected station to prevent energization of said indexing means until its respective cycle of operation is complete and said electrode is fully retracted.

12. In a machine for trepanning successive in-line holes or slots in successive concentric non-parallel and/or undulatory or the like work walls, the combination of a base, an indexible work table mounted on said base having an axis of rotation, a plurality of work stations, the number of which equals the number of said work walls to be penetrated, each work station comprising a tool support mounted on said base in circumferential spaced relation about said work table, a tool electrode having a complementary symmetrical cutting face with respect to the surface contour of the work wall to be trepanned operatively slidable on said tool support for movement to and from said axis of rotation, power operable slide means to operatively move said electrode through successive precut holes in successive walls toward and from its respective work wall to perform a trepanning cycle of operation thereon, means automatically operable by said slide means to energize said electrode after passing through said precut holes electrically operable indexing means for indexing said work table from station to station, a manually latched switch to initially energize said indexing means, a station selector means trip operable by said indexible work table for sequential energization of said power operable slide means at said selected stations, means trip operable by said slide means at said selected station to energize said indexing means when the trepanning cycle is completed and the electrode has been fully retracted, and means trip operable by said indexible work table to unlatch said switch upon completion of the desired number of cycles of operation.

13. In a machine for simultaneously trepanning a plurality of successive angularly spaced in-line holes or slots in successive concentric non-parallel and/or undulatory or the like work walls, the combination of a base, an indexible work table mounted on said base having an axis of rotation, a plurality of work stations, the number of which equals the number of said work walls to be penetrated, each work station comprising a tool support mounted on said base in circumferentially spaced relation about said work table, a tool electrode having a complementary symmetrical cutting face with respect to the surface contour of the work wall to be trepanned operatively slidable on said tool support for movement toward and from said axis of rotation, power operable slide means to operatively move said electrode through successive precut holes in successive walls toward and from its respective work wall to perform a trepanning cycle of operation thereon, means automatically operable by said slide means to energize said electrode after passing through said precut holes electrically operable indexing means for indexing said work table from station to station, a manually latched switch to initially energize said indexing means, station selector means trip operable by said indexible work table for simultaneous selective energization of said power operable slide means at said selected station and/or stations, means trip operable by said slide means at said selected station or stations to energize said indexing means when the trepanning cycle or cycles of operation are completed at all selected stations, and all said electrodes have been fully retracted, and means trip operable by said indexible work table to unlatch said switch upon completion of the desired number of cycles of operation.

14. In a machine for simultaneously trepanning a plurality of successive angularly spaced in-line holes or slots in successive concentric, non-parallel and/or undulatory or the like work walls, the combination of a base, an indexible work table mounted on said base having an axis of rotation, a plurality of work stations, the number of which equals the number of said work walls to be penetrated, each work station comprising a tool support mounted on said base for circumferential adjustment about said work table to preset the position of said tool supports relative to one another, a tool electrode having a complementary symmetrical cutting face with respect to the surface contour of the work wall to be trepanned operatively slidable on said tool support for movement toward and from said axis of rotation, power operable slide means to operatively move said electrode through successive precut holes in successive walls toward and from its respective work wall to perform a trepanning operation thereon, means automatically operable by said slide means to energize said electrode after passing through said precut holes, electrically operable indexing means for indexing said work table from station to station, a manually latched switch to initially energize said indexing means, a station selector means trip operable by said indexible work table for simultaneous selective energization of said power operable slide means at said selected station or stations, means trip operable by said slide means at said selected station or stations to energize said indexing means when the trepanning cycle or cycles of operation are completed at all selected stations and all said electrodes have been fully retracted, and means trip operable by said indexible work table to unlatch said switch upon completion of a desired number of cycles of operation.

15. In a machine for trepanning holes or slots in a work surface by electrical discharge, the combination of a base containing a reservoir of dielectric coolant, a work table mounted on said base having sides formed thereon to hold said dielectric coolant therein, power operable means having starting means to force said coolant from said reservoir into said work table and to maintain a constant coolant level therein during a trepanning operation, a tool support mounted on said base adjacent to said work table, a tool electrode operatively slidable on said tool support for movement to and from said work table, power operable slide means having starting means to operatively advance said electrode, means automatically operable by said slide means to energize said electrode to perform a trepanning cycle of operation thereon, and means trip operable by said slide means to deenergize the second-named power operable means when said electrode has been fully retracted, and means to deenergize the first-named power operable means to drain said coolant back into said reservoir.

16. In a machine for cutting successive holes in a plurality of successive walls which are non-parallel and/or undulatory with hollow or tubular electrodes, the end faces of which must be complementary-symmetrical to the surface contour of the respective walls, whereby each successive electrode must pass through a previously formed hole to reach its cutting position, the combination of an indexable table for supporting the work having an axis of rotation, means to support a plurality of electrodes in laterally spaced relation for cyclic movement in paths radially of said axis to and from the work, said table having means forming a tank for submerging the work in coolant during the machine operation, a bed supporting the table and containing a supply of coolant, means to fill the tank from said supply to a predetermined level, means to automatically indicate when the tank is full, an electrode cycle control mechanism having a start button for automatically indexing the table and initiating movement of the first electrode toward the work, means automatically operable during movement of the electrode to energize said electrode to cut or trepan a hole in the first wall, trip operable means for automatically retracting the electrode and stopping it in return position, a signal light illuminated by the return of the electrode to indicate operation of the start button to effect indexing of the table, an electrode selector mechanism indexible from station to station, means responsive to the table movement to index said selector mechanism to its next station, means at that station to institute advance of two electrodes, said selector mechanism having a third station for causing advance of three electrodes and a fourth station for causing simultaneous advance of four electrodes, and means to drain the tank.

17. In an electric discharge machine for trepanning holes in work by means of a hollow electrode, the discharge perimeter of which must be evenly spaced at all points from the work surface to provide a uniform discharge gap, the combination of means for forming successive holes in successive non-parallel and/or undulatory work walls with such electrodes, the number of which equals the number of walls to be penetrated, comprising an indexible table for supporting the work and having an axis of rotation, means to support said electrodes in laterally spaced relation about said table for cyclic movement in paths radially of said axis to and from the work, said table having means forming a tank for submerging the work coolant during the machining operation, a bed supporting the table and containing a supply of coolant, means to fill the tank from said supply to a predetermined level, means for automatically indicating said level, a power operable table indexing mechanism, a station type electrode selector mechanism, a plurality of electrode feeding cycle control mechanisms, each operatively connected to a starting limit switch in said selector mechanism, a starting button for energizing said indexing mechanism, means trip operable by the table to index said selector mechanism one station to selectively operate said limit switches and initiate operation of one or more electrode cycle control mechanisms, means responsive to completion of said electrode cycles to initiate the next table indexing operation, and means to drain the tank upon completion of the work.

18. In a machine for cutting or forming a plurality of in-line holes in a plurality of successive work pieces, the combination of a base, a rotatable worktable mounted on the base, means for indexing said worktable, a plurality of tool supports mounted on the base in circumferential spaced relation with respect to the worktable, each tool support comprising a lower slide supporting an upper slide, a cutting element or electrode affixed to the upper slide, power operable means for rapidly traversing said lower slide toward and from the worktable to establish a predetermined gap between the electrode and work affixed to the worktable, power feeding means responsive to said gap distance for feeding said upper slide and electrode to effect the machining operation, and automatic control means to control movement of the plurality of electrodes either simultaneously or consecutively to trepan a plurality of radially spaced, in-line holes by simultaneously cutting at all points around the perimeters of the holes.

19. In an electric discharge machine for trepanning a hole through successive non-parallel walls of a workpiece with hollow electrodes, the discharge perimeter of which must be evenly spaced at all points from the work surface to provide a uniform discharge cutting gap therebetween, the combination of means for forming the succession of holes in the respective walls comprising several electrodes having the same cross sectional shapes of the hole to be trepanned, there being one electrode for each wall having its end face contoured in complementary symmetrical relationship to the surface contours of the wall to be cut thereby, an indexible table for supporting the work and having an axis of rotation, means to support said electrodes at stations circumferentially spaced about said axis, means to index the table to successive stations to present the work to the respective electrodes for penetration of a respective wall thereby, separate power operable means at each station to radially advance the electrode with respect to said axis of rotation at rapid traverse to a cutting position opposite its respective wall whereby each electrode except the first must pass through a hole or holes formed by preceding electrodes, and means to energize the electrodes as they reach cutting position.

20. In an electric discharge machine for trepanning a hole through successive non-parallel walls of a work piece with hollow electrodes, the discharge perimeter of which must be evenly spaced at all points from the work surface to provide a uniform discharge cutting gap therebetween, the combination of means for forming the succession of holes in the respective walls comprising several electrodes having the same cross sectional shape as the hole to be trepanned, there being one electrode for each wall having its end face contoured in complementary symmetrical relationship to the surface contour of the wall to be cut thereby, an indexible table for supporting the work and having an axis of rotation, means to support said electrodes at stations circumferentially spaced about said axis, means to index the table to successive stations to present the work to the respective electrodes for penetration of a respective wall thereby, separate power operable means at each station to radially advance the electrode with respect to said work at rapid traverse to cutting position opposite its respective wall whereby each electrode except the first must pass through a hole or holes formed by preceding electrodes, and means to energize the electrodes as they reach cutting position.

21. In a machine for trepanning a hole in the wall of a work piece by electrical discharges, the combination of a frame having an electrically grounded work support thereon, means to secure a work piece to said support, slide means operatively mounted on said support for movement to and from said work support, a trepanning tool electrode carried by said slide means but insulated therefrom, electrical means connected to said electrode for energizing the same, means to feed said slide means to move said energized electrode into electric discharge relationship to the work to effect a trepanning operation thereon and thereby separate an islet of material to form a hole in the work, and means carried by the slide means for gripping said islet of material during the trepanning operation, said feeding means being reversible upon completion of the trepanning operation for withdrawing said electrode and said islet of material from said work.

22. In a machine for trepanning a hole in the wall of a work piece by electrical discharges, the combination of a frame having an electrically grounded work support thereon, means to secure a work piece to said support, slide means operatively mounted on said support for movement to and from said work support, a trepanning tool electrode carried by said slide means but insulated therefrom, electrical means connected to said electrode for energizing the same, means to feed said slide means to move said energized electrode into electric discharge relationship to the work to effect a trepanning operation thereon and thereby separate an islet of material to form a hole in the work, and magnetic means carried by the slide means for gripping said islet of material during the trepanning operation, said feeding means being reversible upon completion of the trepanning operation for withdrawing said electrode and said islet of material from said work.

23. In a machine for trepanning a hole in the wall of a work piece by electrical discharges, the combination of a frame having an electrically grounded work support thereon, means to secure a work piece to said support, slide means operatively mounted on said support for movement to and from said work support, a trepanning tool electrode carried by said slide means but insulated therefrom, electrical means connected to said electrode for energizing the same, means to feed said slide means to move said energized electrode into electric discharge relationship to the work to effect a trepanning operation thereon and thereby separate an islet of material to form a hole in the work, means carried by the slide means for gripping said islet of material during the trepanning operation, said feeding means being reversible upon completion of the trepanning operation for withdrawing said electrode and said islet of material from said work, and means to submerge the work in a dielectric current during the trepanning operation.

References Cited in the file of this patent
UNITED STATES PATENTS

| | | |
|---|---|---|
| 2,066,588 | Taylor | Jan. 5, 1937 |
| 2,526,423 | Rudorff | Oct. 17, 1950 |